(12) United States Patent
Melski et al.

(10) Patent No.: US 9,069,644 B2
(45) Date of Patent: Jun. 30, 2015

(54) ARCHITECTURE AND METHOD FOR VERSIONING REGISTRY ENTRIES IN A DISTRIBUTED PROGRAM BUILD

(75) Inventors: John Eric Melski, Santa Clara, CA (US); Hongduc Nguyen, San Jose, CA (US)

(73) Assignee: Electric Cloud, Inc., Sunnyvale, CA (US)

( * ) Notice: Subject to any disclaimer, the term of this patent is extended or adjusted under 35 U.S.C. 154(b) by 1763 days.

(21) Appl. No.: 12/422,022

(22) Filed: Apr. 10, 2009

(65) Prior Publication Data

US 2010/0262948 A1   Oct. 14, 2010

(51) Int. Cl.
*G06F 9/44*   (2006.01)
*G06F 9/445*   (2006.01)
*G06F 9/455*   (2006.01)

(52) U.S. Cl.
CPC .............. *G06F 8/71* (2013.01); *G06F 9/44505* (2013.01); *G06F 9/455* (2013.01)

(58) Field of Classification Search
CPC ........................................................ G06F 8/71
USPC ........................................................ 717/101
See application file for complete search history.

(56) References Cited

U.S. PATENT DOCUMENTS

| | | |
|---|---|---|
| 4,558,413 A | 12/1985 | Schmidt et al. |
| 4,951,192 A | 8/1990 | Chase, Jr. et al. |
| 5,313,635 A | 5/1994 | Ishizuka et al. |
| 5,325,533 A | 6/1994 | McInerney et al. |
| 5,442,791 A | 8/1995 | Wrabetz et al. |
| 5,500,881 A | 3/1996 | Levin et al. |
| 5,574,898 A | 11/1996 | Leblang et al. |

(Continued)

FOREIGN PATENT DOCUMENTS

| | | |
|---|---|---|
| EP | 0 859 314 | 8/1998 |
| JP | 03-244033 A | 10/1991 |
| JP | 2001-216139 A | 8/2001 |

OTHER PUBLICATIONS

Smith, Paul D., "Advanced Auto-Dependencey Geneartion", Jun. 23, 2000, XP002656036, http://make.paulandlesley.org/autodep.html [retrieved on Feb. 8, 2011] the whole document, 7 pages.*
IBM Corporation: "Use the Template Registry to Define Template Functions", Dec. 31, 2003, 1 page, XP002683035, Retrieved from the Internet: U RL :http://publib.boulder.ibm.com/infocenter/macxhelp/v6v81/index.jsp?topic=%2Fcom.ibm.vacpp6m.doc%2Fcompiler%2F.*

(Continued)

*Primary Examiner* — Wei Zhen
*Assistant Examiner* — Mohammed Huda
(74) *Attorney, Agent, or Firm* — Blakely, Sokoloff, Taylor & Zafman LLP

(57) ABSTRACT

A method for executing program builds. According to one embodiment of the invention, jobs are scheduled for a program build based on dependencies between the jobs, where at least some of those jobs include one or more registry operations. Usage information is collected from each of those jobs responsive to those jobs being executed. The usage information includes registry usage information from those jobs that include one or more registry operations and includes the results of those registry operations. The registry usage information is analyzed to determine whether the execution of any of those jobs resulted in a conflict. The analyzing includes, for each job including a registry operation, comparing a version of a registry entry used by that job in the program build with a version of a registry entry that the job would have used in a sequential program build. Results of jobs that generated a conflict are invalidated, and the invalidated job is rebuilt using the correct registry entry versions.

23 Claims, 27 Drawing Sheets

(56) References Cited

U.S. PATENT DOCUMENTS

| | | | |
|---|---|---|---|
| 5,692,193 A | 11/1997 | Jagannathan et al. | |
| 5,742,778 A | 4/1998 | Hao et al. | |
| 5,956,479 A | 9/1999 | McInerney et al. | |
| 6,026,413 A | 2/2000 | Challenger et al. | |
| 6,094,528 A | 7/2000 | Jordan | |
| 6,226,667 B1 | 5/2001 | Matthews et al. | |
| 6,237,143 B1 | 5/2001 | Fontana et al. | |
| 6,240,429 B1 | 5/2001 | Thornton et al. | |
| 6,327,143 B1 | 12/2001 | Bonstrom et al. | |
| 6,393,438 B1 | 5/2002 | Kathrow et al. | |
| 6,457,170 B1 | 9/2002 | Boehm et al. | |
| 6,487,577 B1 | 11/2002 | Sundararajan | |
| 6,601,233 B1 | 7/2003 | Underwood | |
| 6,785,848 B1 | 8/2004 | Glerum et al. | |
| 6,810,364 B2 | 10/2004 | Conan et al. | |
| 6,938,252 B2 | 8/2005 | Baylor et al. | |
| 6,948,163 B2 | 9/2005 | Melahn et al. | |
| 6,988,139 B1 | 1/2006 | Jervis et al. | |
| 7,003,759 B2 | 2/2006 | Jameson | |
| 7,055,128 B2 | 5/2006 | Porkka | |
| 7,100,133 B1 | 8/2006 | Meiyappan | |
| 7,168,064 B2 * | 1/2007 | Ousterhout et al. | 717/120 |
| 7,197,547 B1 | 3/2007 | Miller et al. | |
| 7,379,948 B2 | 5/2008 | Gray et al. | |
| 7,395,529 B1 | 7/2008 | Stanton et al. | |
| 7,437,705 B1 | 10/2008 | O'Bryan | |
| 7,735,068 B2 | 6/2010 | Siddaramappa et al. | |
| 7,890,921 B2 | 2/2011 | Munkvold et al. | |
| 8,234,620 B1 * | 7/2012 | Bychkov et al. | 717/100 |
| 2002/0147855 A1 | 10/2002 | Lu | |
| 2002/0194319 A1 | 12/2002 | Ritche | |
| 2002/0199170 A1 | 12/2002 | Jameson | |
| 2003/0105620 A1 * | 6/2003 | Bowen | 703/22 |
| 2003/0126118 A1 | 7/2003 | Burton et al. | |
| 2003/0126194 A1 | 7/2003 | Kase et al. | |
| 2003/0126304 A1 | 7/2003 | Wyatt | |
| 2003/0163799 A1 | 8/2003 | Vasilik et al. | |
| 2004/0073904 A1 | 4/2004 | Hill | |
| 2004/0205565 A1 | 10/2004 | Gupta | |
| 2004/0221256 A1 | 11/2004 | Martin et al. | |
| 2004/0254919 A1 | 12/2004 | Giuseppini | |
| 2005/0038773 A1 * | 2/2005 | Gray et al. | 707/1 |
| 2005/0097441 A1 | 5/2005 | Herbach et al. | |
| 2005/0144610 A1 | 6/2005 | Zenz | |
| 2006/0059253 A1 | 3/2006 | Goodman | |
| 2006/0070030 A1 * | 3/2006 | Laborczfalvi et al. | 717/120 |
| 2006/0184926 A1 | 8/2006 | Or et al. | |
| 2006/0195508 A1 | 8/2006 | Bernardin | |
| 2006/0277542 A1 * | 12/2006 | Wipfel | 717/174 |
| 2008/0098369 A1 | 4/2008 | Ousterhout et al. | |

OTHER PUBLICATIONS

Tu, Qiang et al., "The build-time softwarearchitecture view", Nov. 7, 2001, Proceedings IEEE Intenational Conference on Software Maintenance. ICSM-2001. Florence, Italy, Nov. 7-9, 2001; [IEEE International Conference on Software Maintenance], LOS, 10 pages.*
Knutson, J, "Distributed Parallel Build System for Hierarchically Organized Large Scale Software Systems", IBM Technical Disclosure Bulletin, vol. 39, No. 06, (Jun. 1, 1996), 63-68.*
Free Software Foundation, "GNU Make Manual", Online, Jul. 8, 2002, XP002343577—Retrieved from the Internet on Sep. 5, 2005, URL: http://www.gnu.org/software/make/manual/html.sub.--mono/make.html.
Knutson, J , "Distributed Parallel Build System for Hierarchically Organized Large Scale Software Systems", IBM Technical Disclosure Bulletin, vol. 39, No. 06, (Jun. 1, 1996), 63-68.
Pool, Martin , "distcc User Manual—Chapter 2: Using distcc", Online, Dec. 1, 2002, XP002343569—Retrieved from the Internet on Sep. 5, 2005, URL: http://web.archive.org/web/20021201095253/distcc.samba.org/manual/html/di- stcc-2.html.
Park, Hisup , et al., "Framework for Modeling Dependencies in Collaborative Engineering Process", *Research in Engineering Design*, vol. 11, No. 2, Internet URL,http://www.springerlink.com/content0mppp3ecxby633r1/fulltext.pdf., (1999), 84-102.
International Search Report and Written Opinion, International Application No. PCT/US 10/30250,mailed Jun. 15, 2010, pp. 1-12.
International Search Report from foreign counterpart PCT Application No. PCT/US2010/030250, mailed Oct. 11, 2011, 1 pages.
Written Opinion from foreign counterpart PCT Application No. PCT/US2010/030250, mailed Oct. 11, 2011, 5 pages.
Champaign, J., et al., "Stability and Volatility in the Luinux Kernel", Sep. 1, 2002, XP002654813, http://ieeexplore.ieee.org/stamp/stamp.jsp?tp=&arnumber=1231215 [retrieved on Jul. 29, 2011], 9 pages.
Champaign, J., et al., "Stability and Volatility in the Linux Kernel", Sep. 1, 2002, IEEE, Proceedings of the Sixth International Workshop on Principles of Software Evolution. XP-002654813, 8 pages.
Champaign, J., et al., "Stability and Volatility in the Linux Kernel", iwpse, pp. 95, Sixth International Workshop on Principles of Software Evolution (IWPSE'03), 2003. XP-002654814, 1 page. Sep. 1, 2002, Retrieved from the Internet: URL:http://www.co.
"BTV Toolkit", Software Architecture Group (SWAG) at the University of Waterloo (Ontario, Canada), XP-002654816, 1 page. URL: http://www.swag.uwaterloo.ca/btv/manual/introduction_btvtoolkit.htm [retrieved on Jul. 29, 2011].
"ChangeLog", Software Architecture Group (SWAG) at the University of Waterloo (Ontario, Canada): Oct. 3, 2002, XP002654815, Retrieved from the Internet: URL:http://www.swag.uwaterloo.ca/btv/download.htm [retrieved on Jul. 29, 2011].
Smith, P., "Advanced Auto-Dependency Generation", Jun. 23, 2000, XP002656036, Retrieved from the Internet: URL:http://make.paulandlesley.org/autodep.html [retrieved on Aug. 2, 2011].
Chen, Y-F., et al: "Testtube: a system 1-27 for selective regression testing", May 16, 1994, Software Engineering, 1994. Proceedings. ICSE-16., 16th International Conference on Sorrento, Italy May 16-21, 1994, Los Alamitos, CA, USA, IEEE Comput. Soc, Page.
Kazman R et al: "View extraction and view fusion in architectural understanding", Jun. 2, 1998, Software Reuse, 1998. Proceedings. Fifth International Conference on Victoria, BC, Canada Jun. 2-5, 1998, Los Alamitos, CA, USA,IEEE Comput. Soc, US, Page(s).
Tokuda H et al: "Managing design patterns in make style", Aug. 26, 2001, 2001 IEEE Pacific Rim Conference on Communications, Computers and Signal Processing. Victoria, BC, Canada, Aug. 26-28, 2001; [IEEE Pacific Rim Conference on Communic.
Ramji, V., et al., "Distributed and Optimistic Make: Implementation and Performance" Proceedings of the Annual International Phoenix Conference on Computers and Communications, Apr. 1-3, 1992, IEEE, XP010062435, ISBN 978-0-7803-0605-9, pp. 0531-0538.
Sun Microsystems Inc.: "Appendix C: The dmake Utility", Dec. 19, 2002, XP002652652, Retrieved from the Internet: URL:http://web.archive.org/web/20021219201959/http://docs.sun.com/source/806-3564/Dmake. html #110920 [retrieved on Jul. 14, 2011].
Smith, Paul D.,"Advanced Auto-Dependency Generation",, Jun. 23, 2000, XP002656036, Retrieved from the Internet: URL:http://make.paulandlesley.org/autodep.html [retrieved on Aug. 2, 2011], 7 pages.
Champaign, J., et al., "Stability and Volatility in the Linux Kernel", Sep. 1, 2002, XP002654813, Retrieved from the Internet:URL:http://ieeexplore.ieee.org/stamp/stamp.jsp?tp=&arnumber=1231215 [retrieved on Jul. 29, 2011], 9 pages.
Miller, P., "Recursive Make Considered Harmful" Jan. 1, 1997, XP002582293, Retrieved from the Internet: URL:http://web.archive.org/web/20030916203331/http://aegis.sourceforge.net/auug97.pdf [retrieved on May 11, 2010].
IEEE Computer Society: "Stability and Volatility in the Linux Kernel", Sep. 1, 2002, XP002654814, Retrieved from the Internet: URL:http://www.computer.org/portal/web/csdl/doi/I0.II09/IWPSE.2003.1231215 [retrieved on Jul. 29, 2011] 1 page.
Extended European Search Report from counterpart foreign European Patent Application No. 10762375.3 mailed Oct. 10, 2012, 9 pages.
IBM Corporation: "Use the Template Registry to Define Template Functions", Dec. 31, 2003, 1 page, XP002683035, Retrieved from the Internet: URL:http://publib.boulder.ibm.com/infocenter/macxhelp/v6v81/index.jsp?topic=%2Fcom.ibm.vacpp6m.doc%2Fcompiler%2F.

\* cited by examiner

ARCHITECTURE AND METHOD FOR VERSIONING REGISTRY ENTRIES IN A DISTRIBUTED PROGRAM BUILD

BACKGROUND

1. Field

Embodiments of the invention relate to the field of computer aided software engineering; and more specifically, to an improved architecture for performing distributed software builds.

2. Background

Computer programs are typically built from of a set of source files and "include" files, which require linking with any number of software libraries. During the program creation process, modifying any one of the source files requires recompilation of that part of the program followed by relinking. This process may be automated with software engineering tools such as the "Make" utility designed by Stuart Feldman in the mid 1970's. The Make utility works off of a file called the "Makefile" which indicates in a structured manner which source and object files depend on other files. It also defines the commands required to compile and link the files. Each file to build, or step to perform, is called a "target." Each entry in the Makefile is a rule expressing a target's dependencies and the commands needed to build or make that object. The specific structure of a rule in the Makefile is:

<target file>: list of dependencies
TAB commands to build target

A tree structure indicating dependencies for a series of exemplary source and object files is illustrated in FIG. 1. In the example, the target file a.out is dependent on foo.o and bar.o. In addition, the object file foo.o is dependent on the source file foo.cc and the header file foo.h, and the object file bar.o is dependent on source file bar.cc and foo.h (e.g., foo.cc and bar.cc may contain include statements including the file foo.h).

The Makefile used to specify the hierarchical relationship illustrated in FIG. 1 might read as follows:

```
a.out: foo.o bar.o
    g++ -Wall -g foo.o bar.o
foo.o: foo.cc foo.h
    g++ -Wall -g -c foo.cc
bar.o: bar.cc foo.h
    g++ -Wall -g -c bar.cc
```

Thus, during the build process, if the Make utility detects that foo.h has been modified, it will reconstruct foo.o, bar.o and a.out (i.e., because they all depend, either directly or indirectly, on foo.h).

Typical software projects are far more complex than that represented in FIG. 1. Even a modest-size project can have thousands of files, resulting in an extremely complex dependency structure. In addition, Makefiles may be arranged in a hierarchical structure with higher-level Makefiles invoking lower-level Makefiles to build pieces of the project, adding additional complexity to the build process. The Makefiles are usually supplemented with scripts in a language such as Perl, which invoke Make to produce daily software builds, analyze the output of Make, run automated tests, and so on.

As mentioned above, Make operates incrementally: it only regenerates a target file if one of its dependent files has changed since the last time the target was generated. Thus, in principle it should be possible to rebuild a very large project quickly if only a few source files have changed. In practice, though, there are many times when large projects must be completely rebuilt. The most important of these times is the "nightly" build: most development projects rebuild from scratch every night (a clean build) to make sure the system is still consistent and to generate production versions for testing and release. In principle, nightly builds could be incremental, but in practice the dependency information in Makefiles isn't perfect, so the only way to guarantee consistency between the sources and the compiled version is to build from scratch. Thus, nightly builds are virtually always clean builds. Engineering builds (those for the personal use of individual developers) are often incremental, but if a widely-used header file is modified then most of the project may need to be recompiled. Furthermore, integration points (where developers update their personal workspaces with all the recent changes to the shared repository) typically result in massive recompilation.

Because of the size of modern software projects, clean builds can take a long time. Out of 30 commercial software development teams recently surveyed, only 5 had clean build times of less than two hours. More than half had build times in the 5-10 hour range, and a few reported build times of 40 hours or more. Furthermore, most organizations support multiple platforms and versions, which adds a multiplicative factor to the above times.

Long build times have a high cost for companies where software development is mission-critical. They affect not only engineering productivity and release schedules, but also software quality and overall corporate agility. When a developer makes a change to source code it typically takes at least a full day (one nightly build) before the developer can tell whether the change caused a problem.

There have been numerous attempts to improve the performance of Make over the last two decades. They fall into two general classes: "faster" approaches that execute pieces of the build in parallel, and "smarter" approaches that avoid work entirely.

The -j switch in Gmake is an example of the "faster" approach. When this switch is specified, Gmake uses the dependency information in the Makefiles to identify jobs that don't depend on each other and runs several of them concurrently. For example, "-j 4" asks Gmake to keep 4 separate jobs (pieces of the build) running at any given time. Even on a uniprocessor this provides a modest performance improvement by overlapping computation in one job with I/O in another; when run on multiprocessor machines, additional speedup can be obtained. The parallel approach offers a high potential for performance improvement because there are relatively few dependencies between files in a build. In principle, almost every source file in a project could be compiled simultaneously.

Unfortunately, the dependency information in Makefiles is rarely perfect, especially in large projects with hierarchical Makefiles. As a result, parallel builds tend to reorder the build steps in ways that break the build. For example, a library might be used to link an application before the library has been regenerated, so the resulting application does not accurately reflect the state of the library's sources. Bugs like these are very difficult to track down (the source looks good, but the application doesn't behave correctly). Some organizations have attempted to maintain enough dependency information in Makefiles to enable robust parallel builds, but most do their production builds sequentially to be safe.

In addition to out-of-order problems, multiprocessor scalability limits parallel build speed. Multiprocessor servers typically have only 2-8 CPUs, which limits the potential speedup. Larger-scale multiprocessors may have as many as 32 or 64 CPUs, but these machines are quite expensive ($30K per CPU or more, compared to $1-2K per CPU for workstations and small servers). In addition, bottlenecks within the operating system may prevent an application from taking full advantage of large-scale multiprocessors.

A variation of the parallel build approach is distributed builds, where builds are run in parallel using a cluster of independent machines instead of a multiprocessor. This approach solves the scalability and cost issues with a multiprocessor, but still suffers from out-of-order issues. In addition, distributed builds can be impacted by a variety of distributed-system issues including, for example, high overheads for invoking tasks on remote machines which can limit performance; clocks on each of the machines must be carefully synchronized or file timestamps won't be consistent and future builds may fail (a target may appear to be up-to-date even when it isn't); reliability drops as the cluster size increases due to the lack of recovery mechanisms; and cluster nodes typically use a network file system to access files, which can be considerably slower than accessing files locally on a single build machine. Furthermore, reliability issues in the network file system can affect build reliability.

The second general approach for improving build performance is to reduce the amount of work that must be done, either by doing better incremental builds or by sharing results between independent builds. One example of this approach is the "wink-in" facility in Rational Software's ClearMake™ product. In ClearMake, generated files such as object files are stored in a version control system, along with information about how they were generated. When a build requires a new version of a generated file, ClearMake checks to see if that version has already been generated by some other build; if so, the existing file is used instead of creating a new version. This approach can potentially provide significant improvements when several developers each update their private workspaces with the latest sources from the central repository, or in nightly builds where little has changed.

However, ClearMake depends on the system's ability to capture every piece of state that could possibly affect the contents of a generated file. This includes the versions of files that the target file depends on, the exact commands used to generate the target, environment variables that supply additional arguments to the command, system header files, and so on. All of these pieces of state must be considered when deciding whether a previously-generated file can be used instead of regenerating the file. Even something as subtle as the user ID or the time of day could potentially influence the value of a generated file. If a significant factor is not considered, the system will use an incorrect substitute file. In our discussions with software development organizations, we found several groups that have considered the ClearMake approach, but none that are using it for production builds.

In summary, each of the approaches described above offers the potential for speeding up builds, but each makes the build process more brittle by increasing the risk that a build will fail or that it will be inconsistent with the sources. Of the 30 commercial software development teams surveyed, none had been able to achieve more than a 5-10× speedup in a reliable enough way to use for production builds, and only a very few have achieved even a 5× speedup. Most organizations run their builds completely sequentially or with only a small speedup, in order to keep the process as reliable as possible Software builds performed on a Microsoft® Windows® operating system typically update and/or generate keys and/or values in the Windows registry. The registry is a hierarchical database used to store information related to configuration, user management, applications, hardware devices, etc. An entry in the registry includes keys and values. A key may contain a subkey (which themselves may contain subkeys) and one or more values. For example, the key HKEY_LOCAL_MACHINE\System refers to the subkey "System" of the HKEY_LOCAL_MACHINE key. Values in the registry are name/data pairs stored within a particular key.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
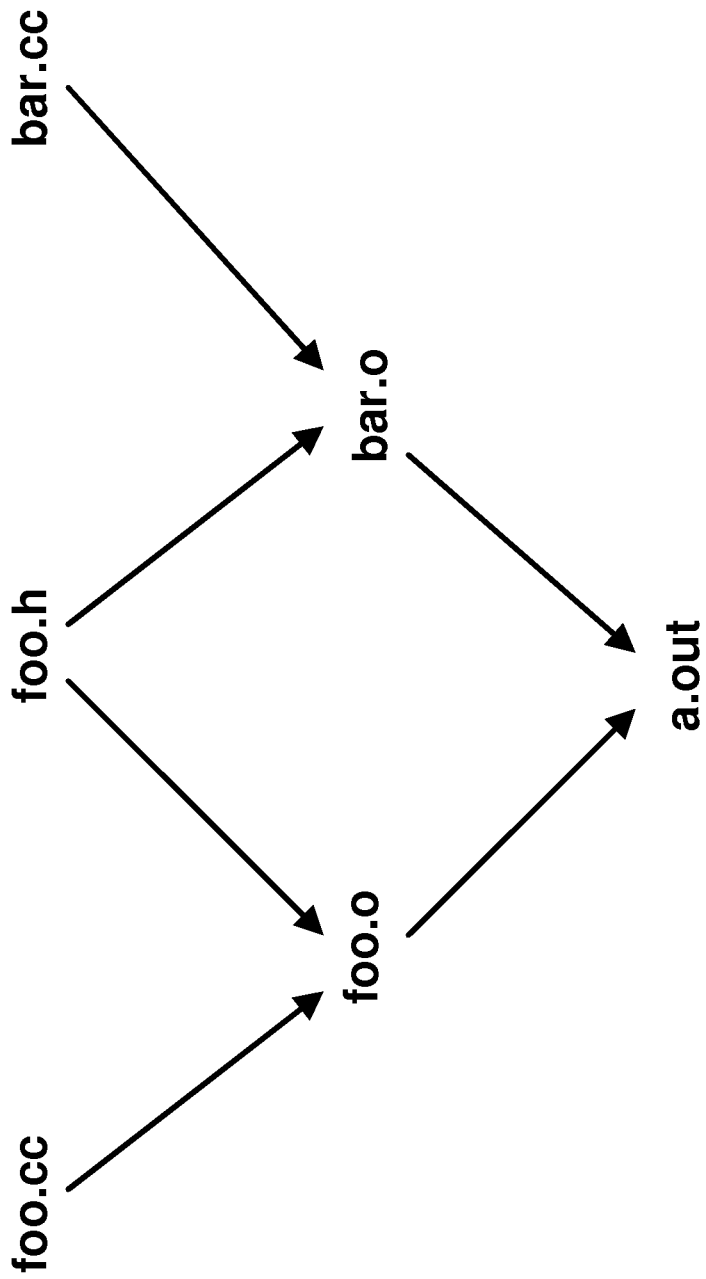
FIG. 1 illustrates an exemplary set of file dependencies analyzed during the build process.
Figure 2:
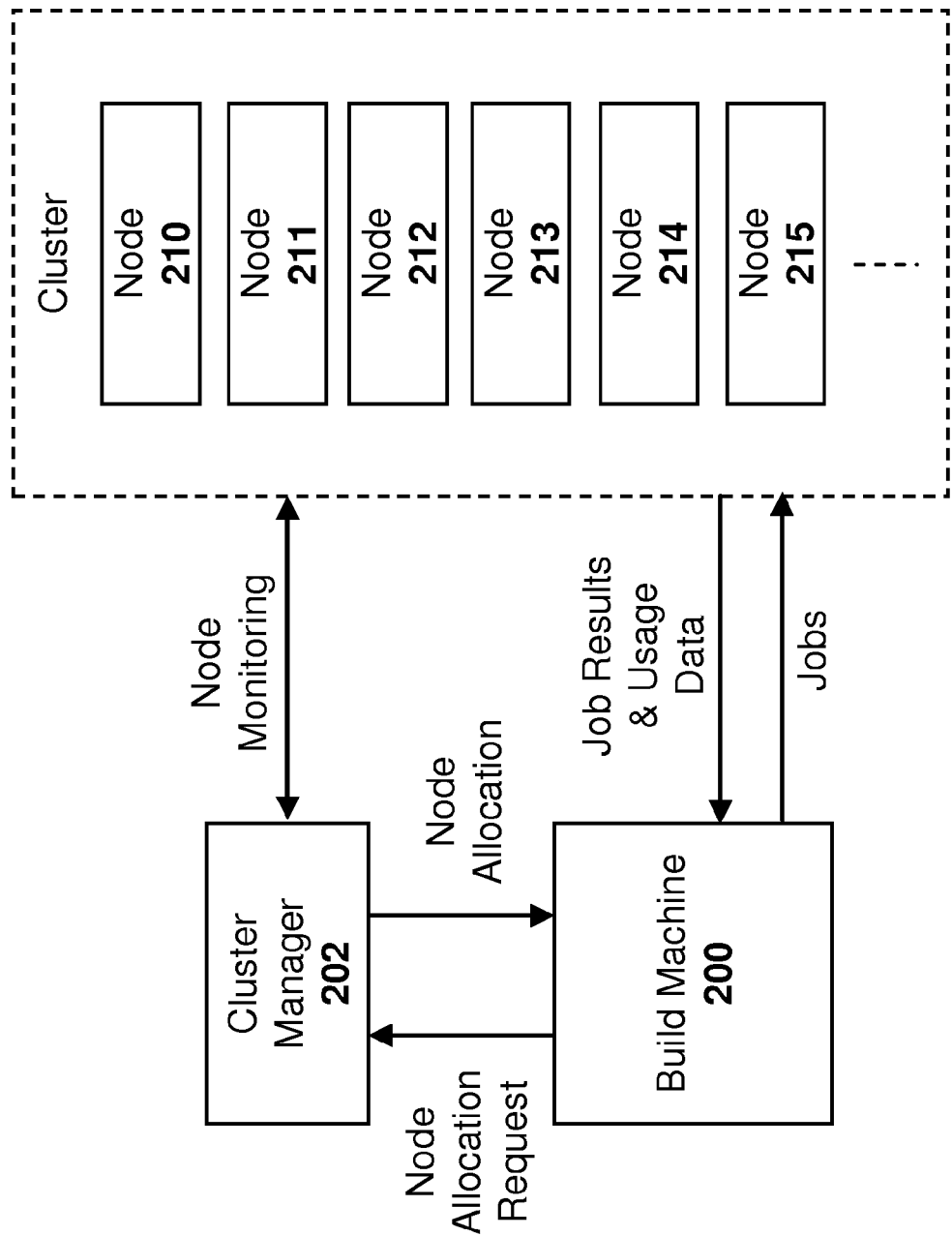
FIG. 2 illustrates an overall system architecture according to one embodiment of the invention.

A network architecture for processing program builds according to one embodiment of the invention is illustrated generally in FIG. 2. The architecture is comprised of a build machine 200 from which the build process is initiated and controlled; a series of nodes 210-215 which, under the direction of the build machine 200, operate on identified portions of the build in parallel, cache source files used during the build process, and collect usage data (including file usage data and registry usage data); and a cluster manager 202 which monitors the status of each of the nodes, and allocates nodes to build machines 200 upon request. According to one embodiment of the invention, the build machine 200 and each of the nodes 210-215 are executing a Microsoft® Windows® operating system.

Figure 3A:
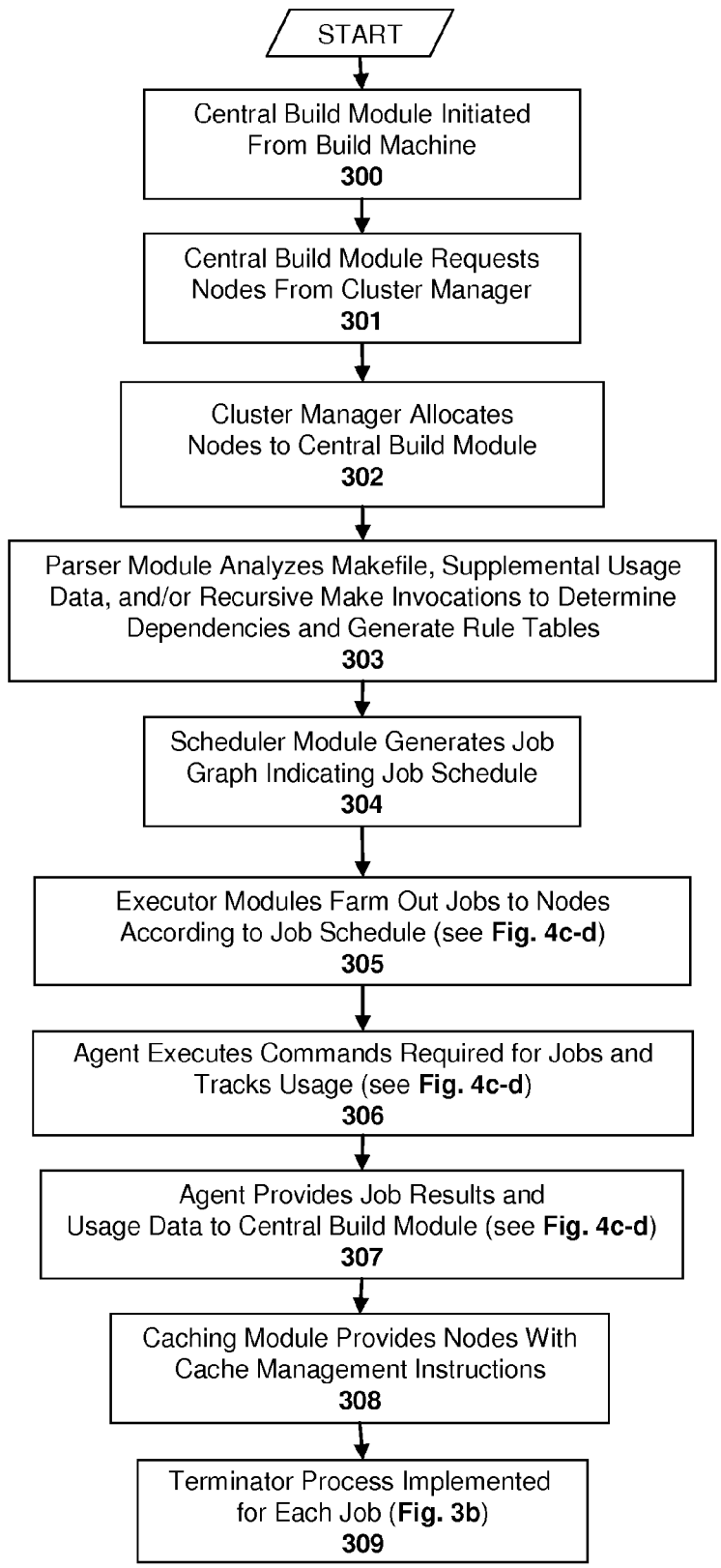
FIGS. 3a-b illustrate one embodiment of a process for performing program builds.
Figure 3B:
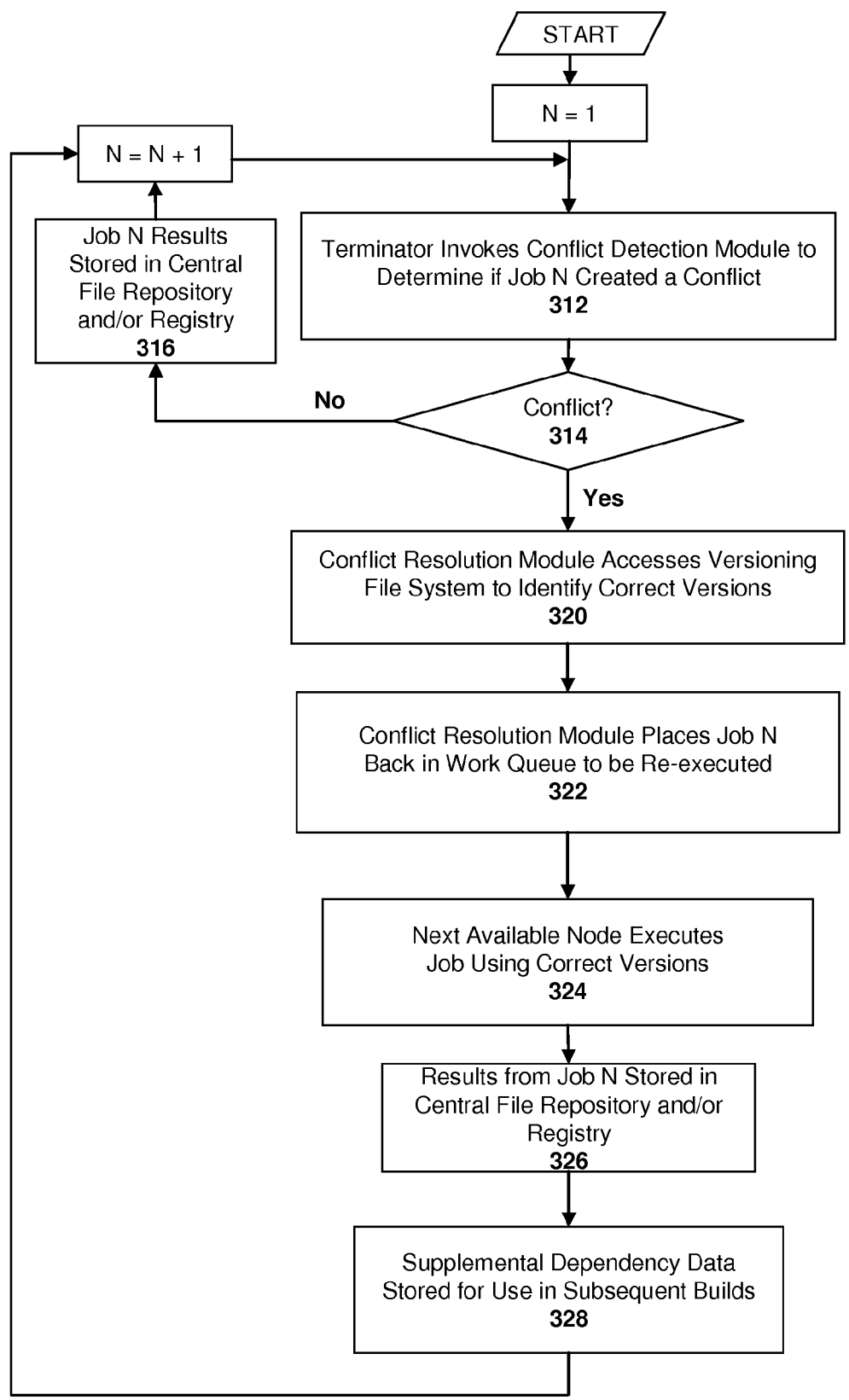
Figure 4A:
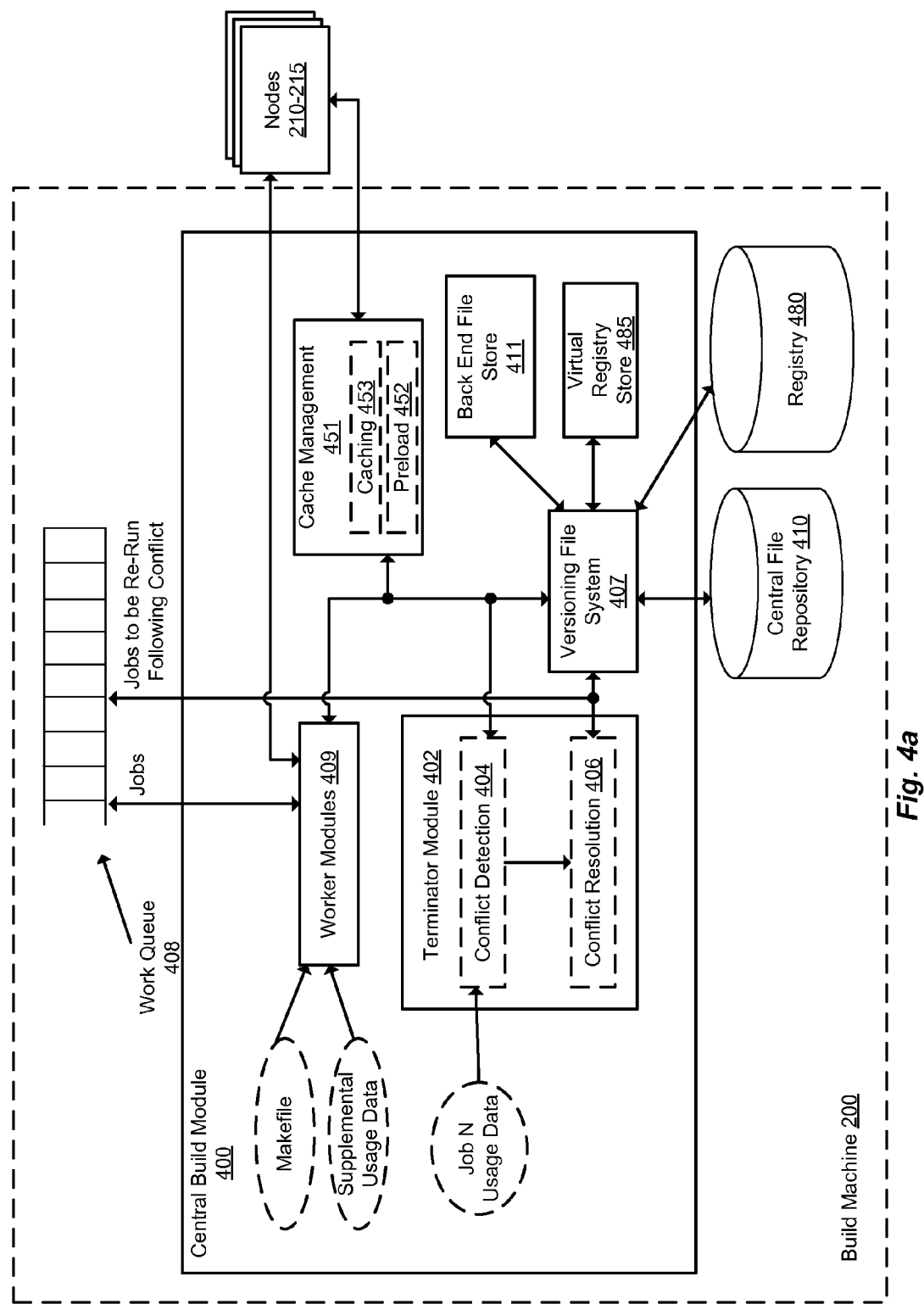
FIG. 4a illustrates a central build module according to one embodiment of the invention.
Figure 4B:
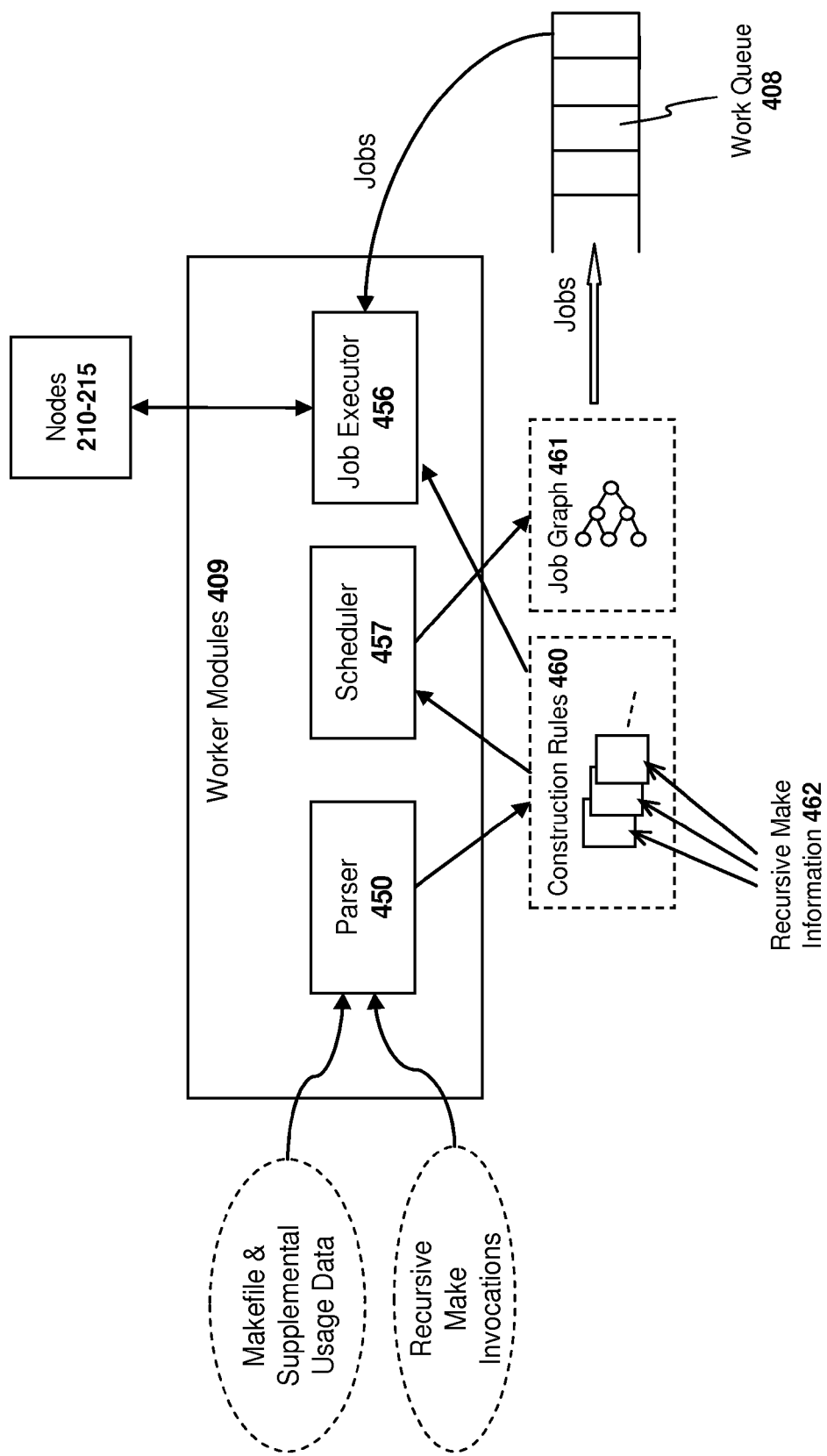
FIG. 4b illustrates different worker modules according to one embodiment of the invention.
Figure 4C:
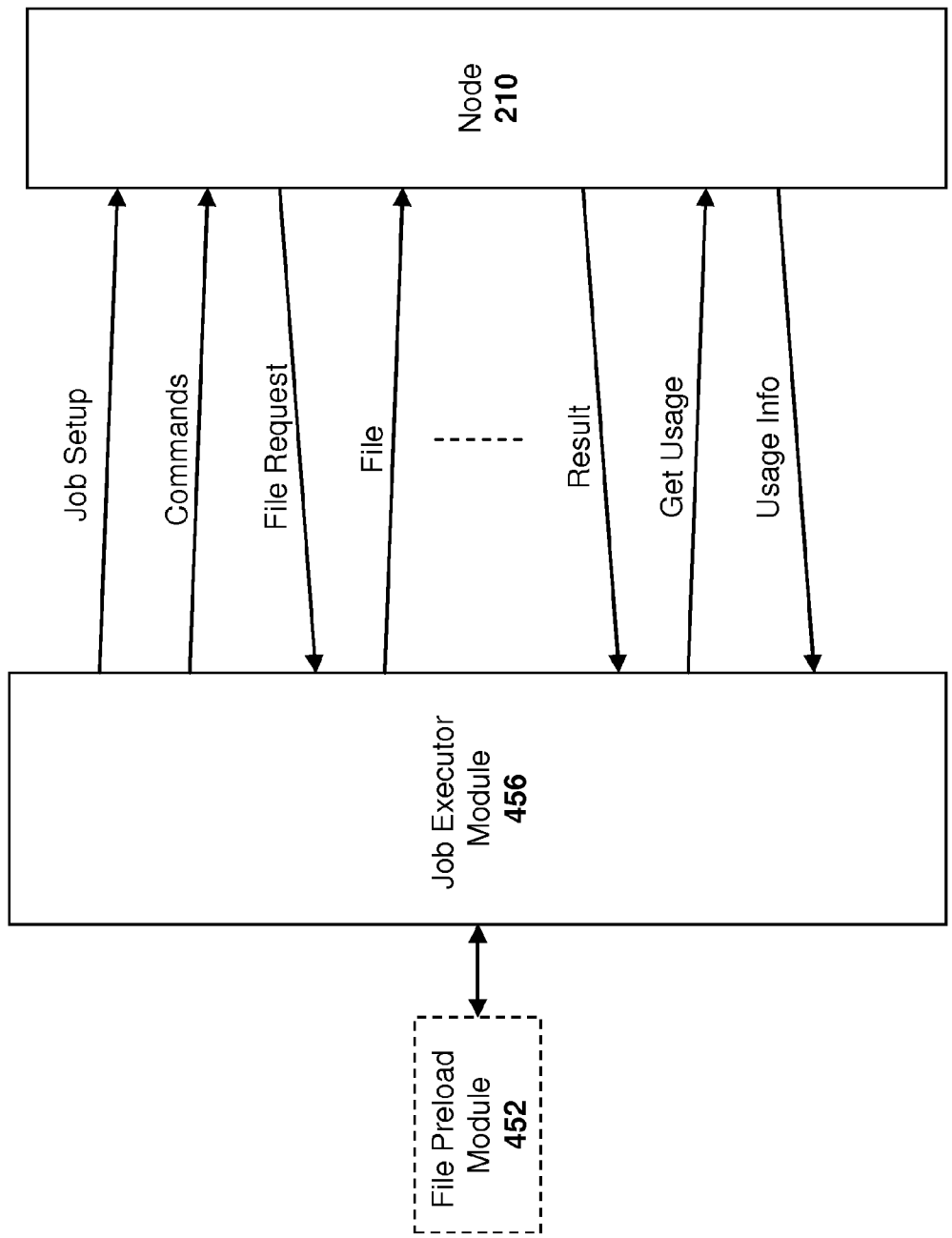
FIG. 4c illustrates a communication session between an executor module and a node when requesting a file according to one embodiment of the invention.
Figure 4D:
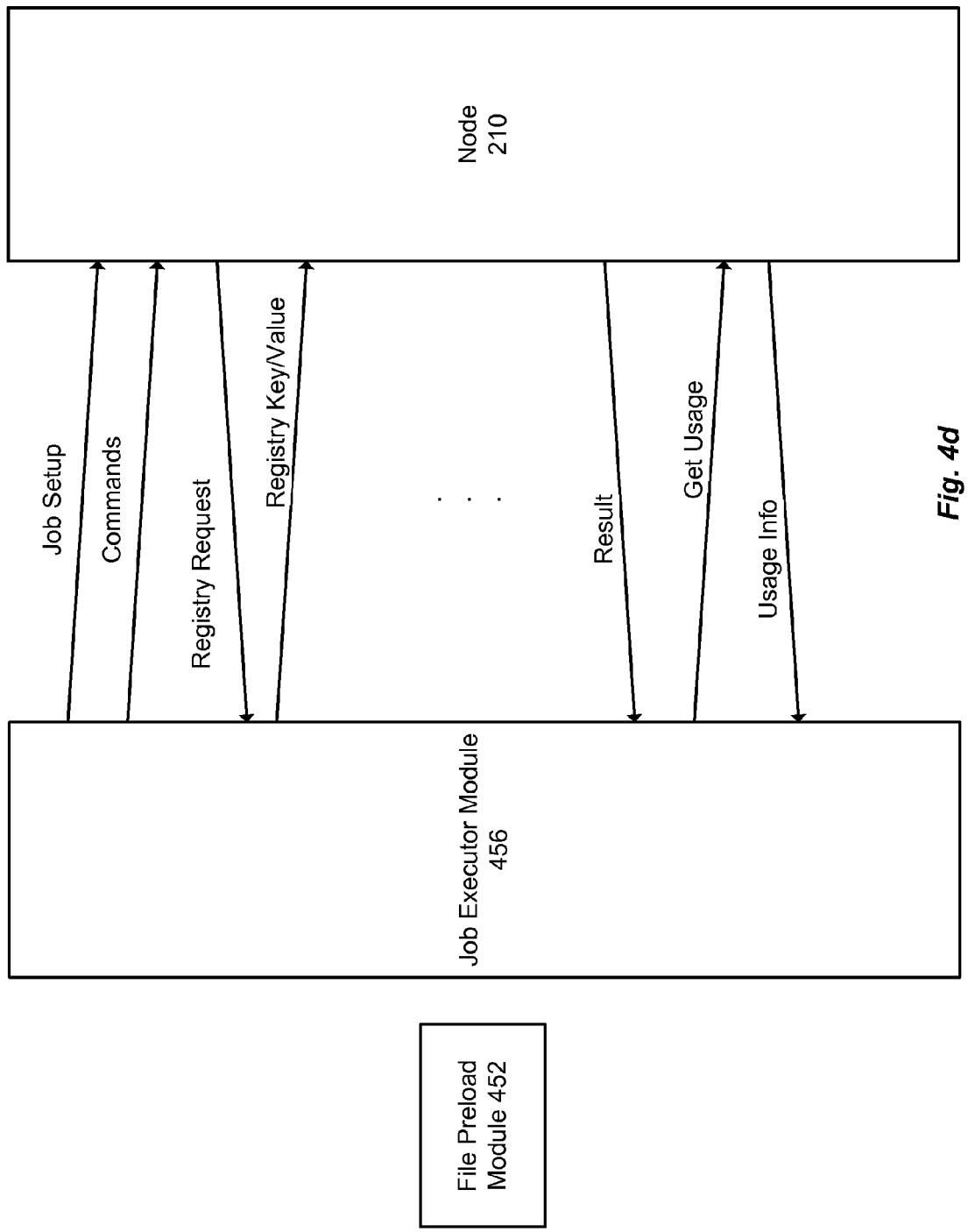
FIG. 4d illustrates a communication session between an executor module and a node when requesting a registry operation according to one embodiment of the invention.
Figure 5:
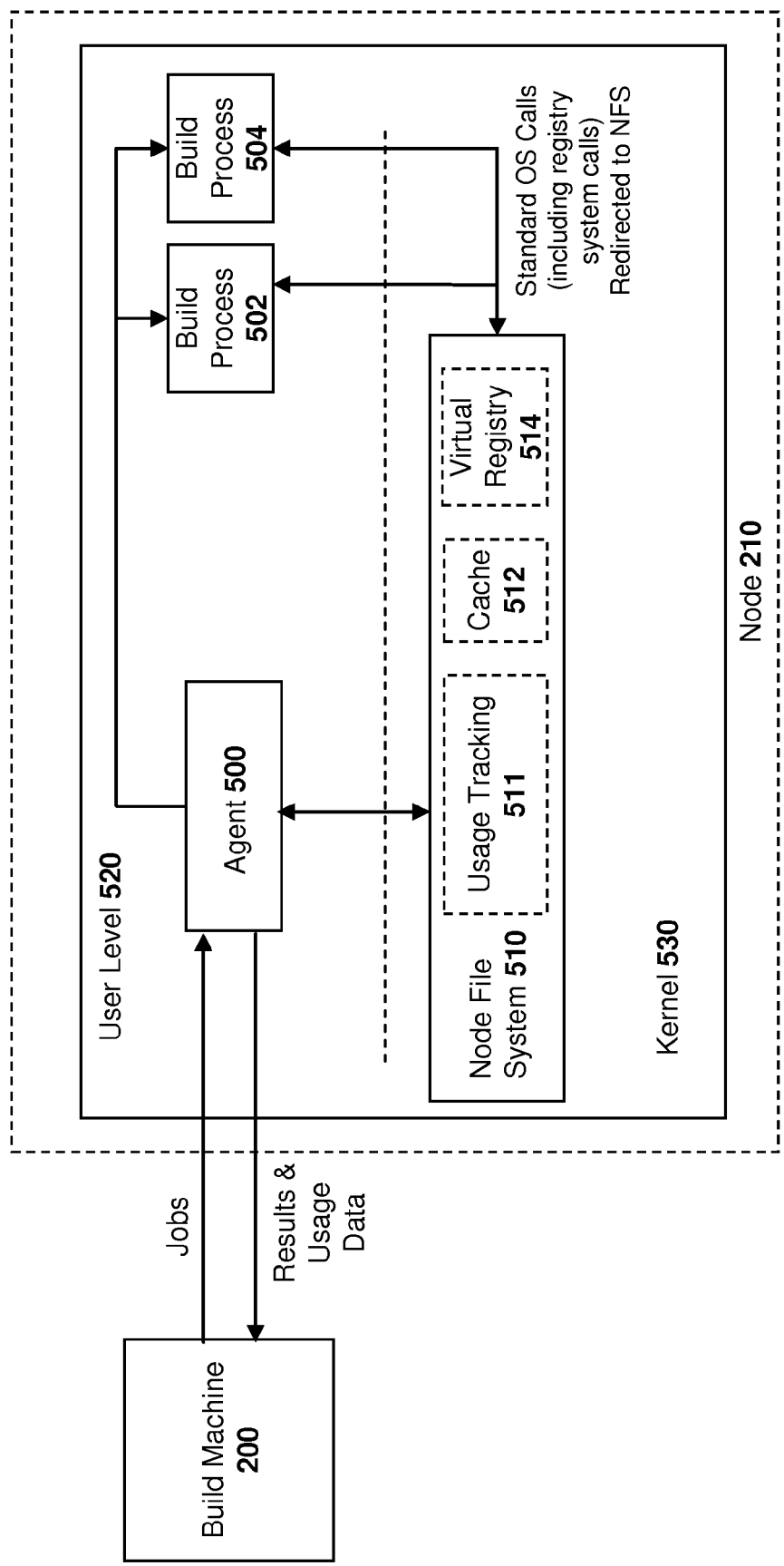
FIG. 5 illustrates a node architecture according to one embodiment of the invention.
Figure 6:
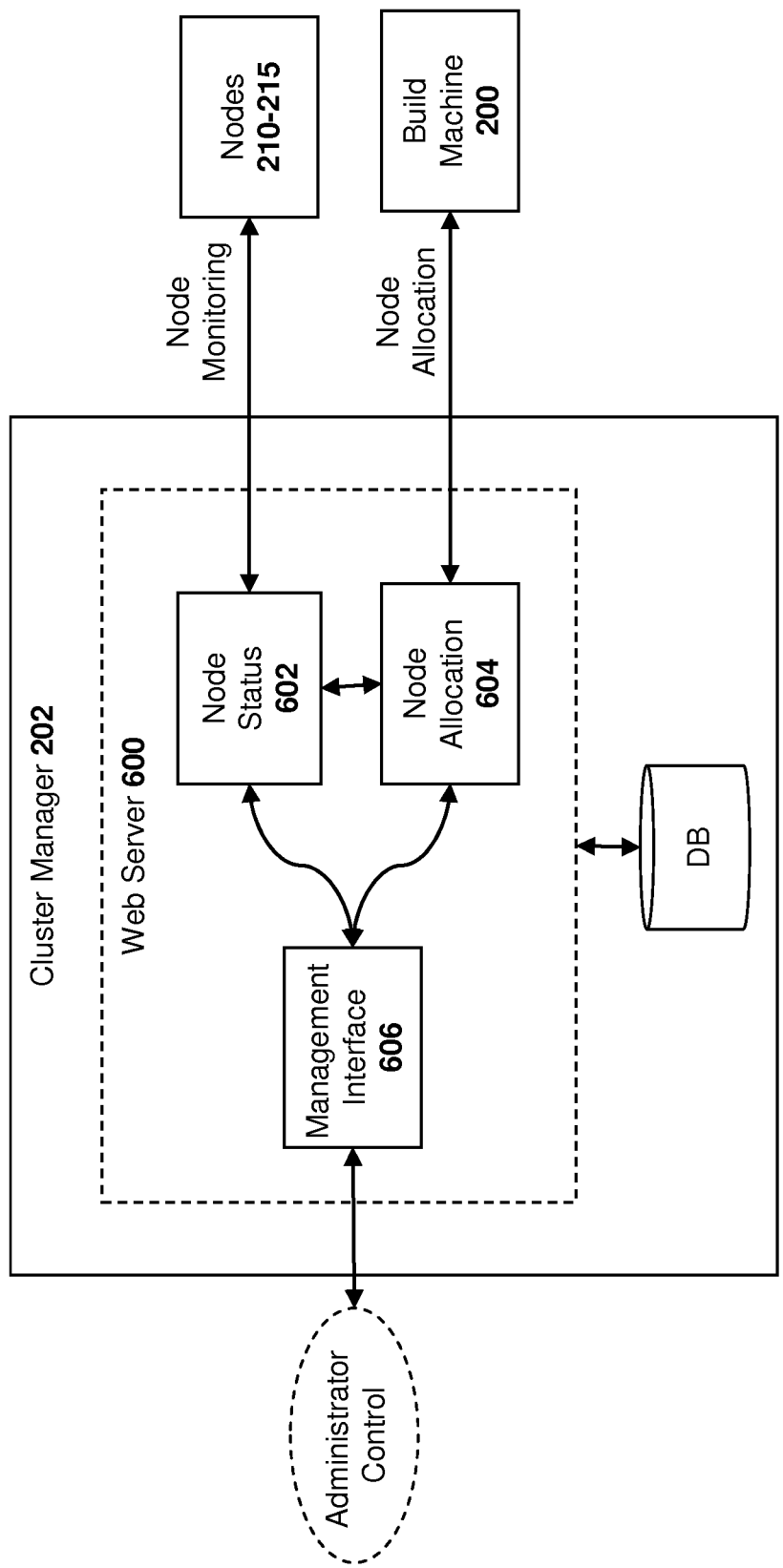
FIG. 6 illustrates a cluster manager according to one embodiment of the invention.

Details of one embodiment of the build machine 200 are illustrated in FIGS. 4a-d; details of one embodiment of a node 210 are illustrated in FIG. 5; and details of one embodiment of the cluster manager 200 are illustrated in FIG. 6. The operation of each of these system components will now be described within the context of the overall build process, illustrated generally in FIGS. 3a-b.

At operation 300 of FIG. 3a, the central build module 400 shown in FIG. 4a is invoked on the build machine 200. The central build module 400 is the focal point for control and analysis during the build process. The central build module 400 collects and processes structural information about source files, file dependencies and associated regeneration rules. This information may be provided, at least in part, from Makefiles. However, while the embodiments of the invention described herein focus on "Makefiles" and the "Make" utility, the underlying principles of the invention may be employed within the context of virtually any software production environment. For example, the invention may be implemented within the context of the "Vesta" system developed by the Systems Research Center of Digital Equipment Corporation (DEC) which uses a "model file" for software builds analogous to the Makefile. In addition, the central build module 400 collects and processes information about registry entries including registry keys and values. Control flows from operation 300 to operation 301.

In one embodiment, the central build module 400 appears to the user to be identical to other versions of Make such as Gmake and Nmake, and/or integrated development environments such as Visual Studio™ from Microsoft. In addition, in one embodiment, the central build module 400 is capable of interpreting Makefiles in several different formats, including those supported by both Gmake and Nmake. Moreover, the central build module 400 may be invoked anywhere that other software build utilities such as Make may be invoked (e.g., engineering workstations or dedicated build machines) and may be invoked interactively or as part of a build script. As used herein, the "build machine" refers to any machine from which the build process is invoked.

The cluster manager 202 allocates nodes to build machines for individual builds. Thus, at operation 301 of FIG. 3a, once the build process is initiated, the central build module 400 requests a list of nodes to be used for the current build from the cluster manager 202. Control flows from operation 301 to operation 302. As illustrated in FIG. 6, in one embodiment, the cluster manager 202 is a Web server 600 which includes a node status module 602, a node allocation module 604, and a management interface 606. It should be noted, however, that various different types of servers other than a "Web" server may be employed as the cluster manager 202 consistent with the underlying principles of the invention.

At operation 302, the cluster manager 202 allocates the nodes to the central build module 400 to be used in the build. Control flows from operation 302 to operation 303. The node status module 602 continually monitors the status of each of the nodes and maintains a list of those nodes which are operating properly and those which are not. In one embodiment, the node status module 602 employs a network management protocol such as the Simple Network Management Protocol ("SNMP") (either the original SNMP standard or SNMP 2). More advanced network management tools such as Hewlett Packard® OpenView®, IBM Tivoli® or LANDesk® management from Landesk Software, Inc., may also be implemented within the cluster manager 202.

The node status module 602 may also evaluate the "health" of each node based on the node's performance during the course of one or more program builds. For example, if a particular node fails during a build on multiple occasions, the node status module 602 may designate the node as inoperative (or otherwise "unhealthy") until it is checked by a system administrator. Similarly, if a particular node is running jobs significantly more slowly than other nodes, then the node status module 602 may flag that node as requiring maintenance. Of course, the underlying principles of the invention are not limited to any particular network management protocol or policy.

In addition, in one embodiment, the cluster manager 202 includes a node management interface 606, allowing system administrators to control the node allocation policy. For example, during the day, the node allocation module 604 may be configured to allow multiple build machines to access the nodes 210-215 for individual builds. By contrast, during the "nightly build" (i.e., in which the entire project is rebuilt), the node allocation module 604 may be configured to lock out all build machines except the build machine from which the nightly build is executed.

In one embodiment, the node allocation module 604 dynamically allocates the nodes 210-215 to requesting build machines. For example, if only one build machine 200 is requesting a set of nodes at given point in time, then the node allocation module 604 may allocate all of the available nodes to the first build machine until a second build machine requests a set of nodes. When the request from the second build machine is received, the node allocation module 604 may then reallocate nodes from the first build machine to the second build machine (i.e., after waiting for the current jobs at those nodes to complete). Various different node allocation policies may be programmed within the node allocation module 604 while still complying with the underlying principles of the invention.

As used herein, the term "job" refers to any individual portion of a program build. As described in detail below, in one embodiment, jobs are executed across a plurality of nodes under the control of the build machine 200. In one particular embodiment, each job is directed to the creation of a single target file. Each job is typically comprised of a series of "operations" required to reproduce the target file (e.g., reading from a file, writing to a file, deleting a file, renaming a file, compiling a source file, linking an object file, . . . etc). In other embodiments, a job may include registry operations (e.g., operations for creating a key, reading a key, deleting a key, creating content of a value, deleting content of a value, modifying content of a value, or other known registry operations). In some embodiments of the invention, some jobs may include operations related to file operations while other jobs may include operations related to registry operations. In some embodiments of the invention, a job may include operations related to file operations and operations related to registry operations.

As illustrated in FIG. 4a, one embodiment of the central build module 400 is comprised generally of a plurality of worker modules 409 and a terminator module 402. The worker modules are responsible for analyzing the Makefile, scheduling jobs to run in parallel across the nodes 210-215, collecting the results from each job, collecting the file usage data from each job (described in detail below), and collecting the registry usage data from the jobs (described in detail below). The terminator module 402 is responsible for ensuring that the job results provided from each node are valid using various detection and conflict resolution techniques, some examples of which are described below.

Referring now to FIG. 4b, in one embodiment, three different types of worker modules 409 are employed to coordinate the build process: a parser module 450, a scheduler module 457 and a job executor module 456. As indicated at operation 303 of FIG. 3a, the parser module 450 analyzes the Makefile, any supplemental usage data (as described below) and/or any recursive Make instances 462 detected and processed by the system. The specific processing associated with supplemental usage data and recursive Make instances is described in detail below. Based on its analysis, the parser 450 generates a set of target construction rules 460 specifying how each individual component of the program build (e.g., each target file) is constructed. The construction rules 460 include all of the dependency information extracted from the Makefile, the supplemental usage data and the recursive Make invocations 462 as well as all of the associated ambient state information (e.g., the current working directory, any command line switches, . . . etc). In one embodiment, the construction rules 460 are stored continuously in main memory so as to be readily accessible by the scheduler 457 and job executor modules 456 during the course of the program build. Control flows from operation 303 to operation 304.

At operation 304 of FIG. 3a, the job scheduler module 457 analyzes the construction rules 460 to generate a job graph 461 indicating the specific order in which jobs are to be executed in parallel on the nodes. By way of example and not limitation, consider the following simple Makefile:

```
module.a: a.o b.o
    ar r module.a a.o b.o
    ranlib module.a
a.o: a.cpp
    g++ a.cpp -c -o a.o
b.o: b.cpp
    g++ b.cpp -c -o b.o
```

In this example, the targets a.o and b.o can be regenerated simultaneously, but module.a cannot be generated until both a.o and b.o are complete. The commands that regenerate the target files (i.e., ar, ranlib, and g++) execute on the allocated nodes 210-215 rather than the build machine 200. In the above example, the jobs for a.o and b.o have only a single command, while the job for module.a has two commands. In one embodiment, a node operates on only a single job at a time. However, multiple jobs may be concurrently executed on each node while still complying with the underlying principles of the invention. Control flows from operation 304 to operation 305.

Jobs which may be executed in parallel are placed together within a work queue 408 from which they are farmed out to the nodes 210-215 (until a conflict is detected, as described in detail below). Specifically, at operation 305 of FIG. 3a, in one embodiment, the job executor modules 456 read the jobs from the work queue 408 and coordinate with the nodes 210-215 to execute the jobs. In one embodiment, each executor module 456 coordinates with a single node at a time to complete a single job (although the specific node used by the executor module 456 may change from job to job). However, the underlying principles of the invention are not limited to any particular pairing of executor modules, nodes and jobs. Control flows from operation 305 to operation 306.

FIG. 4c illustrates the interaction between an executor module 456 and node 210 according to one embodiment of the invention. During the job setup phase, the executor module 456 initiates communication with any available node 210. During setup, the executor module 456 may provide the node with an indication of the current working directory and/or any other environment information required to process the job.

In addition, in order to accelerate the build process and to reduce data traffic between the build machine 200 and the nodes 210-215, a file preload module 452, illustrated in FIG. 4c and shown within a cache management module in FIG. 4a, is employed to preload source files to each of the nodes during the job setup phase. The preload module 452 employs a predictive caching algorithm to predict which source files will be required at each of the nodes ahead of time, using the construction rules 460, the Makefile itself, the file usage data and/or any other data which indicates the files required to complete each job. The files are retrieved from a central file repository 410 by the executor modules 456 through a versioning file system 407 which (as described in greater detail below) manages the different file versions which occur over the life of a build. The central file repository 410 on the build machine stores all of the source files required to process each job of the program build. In one embodiment of the invention, the central file repository 410 operates according to the native file system configured on the build machine (e.g., FAT 32, NTFS, . . . etc) whereas the versioning file system 407 operates at a layer above the native file system, communicating with the file system via the file system's standard interface. However, the underlying principles of the invention are not limited to any particular architecture for the central file repository 410. For example, in one embodiment, the central file repository 410 is a relational database accessible by the versioning file system via database queries.

According to one embodiment of the invention, the registry 480 on the build machine stores all of the registry entries of the build machine. In one embodiment of the invention, the registry 480 operates according to the native operating system configured on the build machine and is accessible through standard registry operations.

If a particular job requires a source file which has not been preloaded to the node 210 on which the job is executing, as described above, the node 210 may request the file from the executor module 456 on the build machine 200 during the execution of the job. The executor module 456 will then retrieve the file via the versioning file system 407 and provide the file to the requesting node 210.

Returning again to the overall build process set out in FIG. 3a, at operation 306, in response to build commands provided from the executor module 456, the agent executed on the node 210 invokes the processes required to complete the job and tracks usage. In the specific example shown in FIG. 5, an agent 500 invokes two build processes, process 502 and process 504, to complete the node's 210's assigned job. By way of example, the processes 502 and 504 might be ar and ranlib as described above. In one embodiment, both of the processes 502 and 504 and the agent 500 operate at the application or user level 520 whereas the node file system 510 functions within the node operating system kernel 530. Control flows from operation 306 to operation 307.

In one embodiment, the processes 502 and 504 invoked by the agent 500 access files such as source files and headers using standard function calls to the OS kernel 530. Thus, standard build applications such as gcc, ar, ranlib, and g++ may be employed on each of the nodes without modification. In one embodiment of the invention, the processes 502 and 504 include registry operations. In one embodiment, the node file system 510 manages a specified portion of the file system (e.g., a specified directory and set of subdirectories within the file system hierarchy) and a portion of the registry (the portion of the registry virtualized in the virtual registry 514). The kernel 530 is aware of the portion of the file system managed by the node file system 510 and forwards any function calls directed to this portion of the file system to the node file system 510 (e.g., function calls associated with file usage). The node file system 510 then supplies the requested files to the processes 502 and 504. In one embodiment, to improve performance, the node file system 510 stores file information entirely in main memory; it does not use the local mass storage device for the files of the build. Although not illustrated in FIG. 5, it should be understood that the node 210 includes a registry.

The kernel 530 is also aware of the portion of the registry that is virtualized in the virtual registry 514 and redirects registry operations directed to a path included in the virtual registry 514 to the virtual registry 514. According to one embodiment of the invention, the kernel 530 intercepts registry operations when processing a job and redirects that job to information maintained by a kernel module (e.g., the node file system 510). According to one embodiment of the invention, the node file system 510 hijacks system calls for registry operations. The operating system of the node 210 includes a system call table. Each registry operation has an entry in the system call table which points to software code to complete that registry operation. By way of example, upon receiving a registry operation for a key/value that belongs to the virtual registry 514, the entry in the system call table is modified to point to software code local to the agent 500. After the job has been completed, the system call table is modified back to its original state. According to another embodiment of the invention, certain Windows operating systems include a mechanism to register callbacks of registry operations. This has the same affect as modifying the system call table since the registry operations are redirected, but this does not require that the system call table be modified.

In one embodiment of the invention the paths included as a part of the virtual registry 514 are configured by an operator of the build, while in another embodiment of the invention a certain number of default paths are included as part of the virtual registry 514 with the addition of any operator configured path (e.g., HKCR (with the exception of HKCR\Installer and HKCR\Licenses)).

According to one embodiment of the invention, the virtual registry 514 is a collection of keys and values used for and only during the build process. The virtual registry 514 is used to compensate for registry modifications between multiple nodes. For example, since jobs may be running on multiple nodes, each with their own registry, modifications on one machine are not visible on modifications on another. In addition, some nodes may have local keys and values for the keys which may differ between the nodes. Thus, the virtual registry 514 allows each job running on different nodes to have a consistent source of registry information. According to one embodiment of the invention, the virtual registry 514 is a portion of a registry used specifically for the build process. For example, after a job has been completed, the registry entries in the virtual registry 514 are cleared. Thus, the virtual registry 514 is a snapshot in time of the registry at a point in the lifetime of the build. The virtual registry 514 is accessed using the same functions as would be used to access a non-virtualized registry entry. Thus, by way of example, in one embodiment of the invention, the file system 510 leverages the use of the standard Windows functions to access the virtual registry 514.

According to one embodiment of the invention, the virtual registry 514 is dynamically built based on the registry operations of a particular job. For example, if a job requests a registry operation and the path of the registry operation belongs to the virtual registry 514, and that registry entry (e.g., key and value) is not part of the virtual registry 514, the node file system 510 issues a request to the user-level agent 500, which in turn relays the request to the central build module 400. In a similar fashion, when a process requests information not present in the node file system's 510's kernel-level cache 512 (e.g., because the file was not preloaded or cached as described above), the node file system 510 issues a request to the user-level agent 500. The agent 500 then relays the request to the central build module 400 using, in one embodiment, a simple TCP-based protocol. In one embodiment, the agent 500 maintains an open TCP socket connection with the build machine 200 throughout the course of the build. According to one embodiment of the invention, the central build module 400 acts as a central file server for the nodes and central registry entry server, reading files and registry entries via the versioning file system 407 and passing the files and registry entries to the nodes. The agent 500 receives the file data or registry entry data, forwards it into the OS kernel 530, and notifies node file system 510, which then completes the original request.

In one embodiment of the invention, if the value of a requested registry key does not exist in the registry of the local node (e.g., the node 210), the user-level agent 500 relays the request to the central build module 400 to receive the value. However, if the value of a requested registry key exists in the registry of the local node, then that value will be used. This is done because certain registry information related to the local machine (node) may be adversely affected during a parallel build. For example, some programs store license information in the registry (e.g., Visual Studio). Often these programs are licensed to a specific host name. If the local value was not used during the build, those programs may not operate correctly (or even at all). Thus, when populating the virtual registry 514, values existing on the local registry are given preference and are used, and values not existing on the local registry will be provided by the central build machine 400 (via the virtual registry store 485).

FIG. 4d illustrates a communication session between an executor module and a node when requesting a registry operation according to one embodiment of the invention. During the job setup phase, the executor module 456 initiates communication with any available node (e.g., the node 210). Additionally, the executor module 456 may provide the node with other environment information required to process the job. The executor module 456 issues commands for the node 210 to execute to complete processing of the job. The node in turn invokes a certain number of processes required for processing of the job and tracks usage. Upon intercepting a registry request (and the key or value is not stored on the node 210), the node 210 issues the registry request to the executor module 456. The executor module 456 determines the correct registry key or value and returns it to the node 210.

According to one embodiment of the invention, upon receiving the registry key and/or value from the job executor module 456, the node 210 creates an entry in its virtual registry (e.g., virtual registry 514) for that key and/or value, and uses that information when processing the job. According to another embodiment of the invention, the job executor module 456 returns only the content of a particular registry operation and the node 210 does not create an entry in the virtual registry 514 but rather only uses that content during processing of the job. For example, if the node 210 requests the content of the value HKCR\foo\bar, the build machine looks up the content for that value (e.g., BAR=123) and returns that value to the node 210.

In one embodiment, to enable efficient file queries, the node file system 510 provides a virtual image of a particular directory from the build machine, plus an image of all of the files and directories that lie underneath it. The root directory of this subtree may be specified as an argument to the central build module 400 or as an environment variable. In one embodiment, the central build module 400 automatically determines the scope of the virtual directory image based on anticipated file usage. For example, the construction rules 460 contain an indication of the directories of all files required during the build process. As such, the central build module 400 analyzes the construction rules 460 to determine the lowest common ancestor of all directories referenced during the build. Based on its analysis, the central build module 400 provides a virtual image of the lowest common ancestor and all subdirectories beneath the lowest common ancestor to the node file system 510, thereby ensuring that a virtual image is provided for any directory referenced during the build.

In one embodiment, the virtual directory image is chosen to include all of the build-specific files used in the build, but not system files such as shared headers and libraries which may be replicated across the nodes statically. However, a virtual image containing shared headers and libraries may be provided as well in accordance with the underlying principles of the invention. In one embodiment, the virtual image provided by the node file system 510 lasts only for a single build; all cached information is flushed at the end of each build, and different builds may have different roots for the node file system image.

In one embodiment, the node file system 510 implements a usage tracking module 511 which collects file usage data and registry usage during the course of a build and provides the file and registry usage data to the central build module 400 for analysis. For example, at operation 307 the agent (e.g., agent 500) executes commands required for the jobs and tracks usage data. Flow moves from operation 307 to operation 308. The usage tracking module 511 records each file accessed by a particular process and each registry operation requested by a process during a job. For example, if during the course of a particular job, a process creates foo.o, modifies foo.c, and reads from foo.h, the usage tracking module 511 automatically records this information until the job is complete. As another example, if during the course of a particular job, a process creates a registry key (e.g., HKCR\foo\bar), modifies the content of a value (e.g., HKCR\foo\bar,123), reads contents of a value (e.g., HKCR\foor\bar,123), the usage tracking module 511 automatically records this information until the job is complete. As described below, the usage tracking module 511 may also store the time it takes for each job to complete. Once the job completes, the agent 500 provides the job results (e.g., the "target" file and modifications to keys and values) and the usage information indicating how the files and the registry were used during the job to the central build module 400 (e.g., foo.c was modified, foo.h was read, foo.o was created, HKCR\foo\bar was created, HKCR\foo\bar,123 was modified, etc.). Alternatively, rather than waiting for the job to complete, the agent 500 may provide the usage information as the files and/or the registry entries are accessed throughout the course of the job.

In one embodiment, the node file system 510 or the agent 500 compresses the usage data prior to transmitting it to the central build module 400. For example, if a particular file was read 10 times, then written to, and then deleted, the only relevant information with respect to the central build module 400 is that the file was read at least once and deleted. Similarly, if a particular file was written to 10 times, only the last write to the file is relevant to the central build module 400. As such, only a single "write" operation will be provided as part of the file usage data. Various additional types of file operations may be collapsed down in this manner while still complying with the underlying principles of the invention.

It should be noted that the various functional modules illustrated in FIG. 5 may be configured to operate within different system levels. For example, in one embodiment, the cache 512 and/or usage tracking module 511 are implemented at the user level 520, rather than within the OS kernel 530 as illustrated in FIG. 5. The location of these functional modules may change depending on the particular OS kernel 530 installed on the node 210.

As illustrated in FIG. 4a one embodiment of the invention includes a cache management module 451 comprising a preload module 452 and a caching module 453. As described above with respect to FIG. 4c, the preload module 452 employs a predictive caching algorithm to predict the files that will be needed at each job before the start of the job using the construction rules 460 and/or any other data which indicates the files required to complete each job. Based on these predictions, the job executor module 456 retrieves the files from the central file repository 410 via the file system 407 and transfers the files to the nodes 210-215 prior to the execution of each job.

Once the source files have been transmitted to the nodes, either through preloading or through on-demand fetches, at operation 308 in FIG. 3a, the caching module 453 instructs the nodes 210-215 to cache certain source files across multiple jobs according to a specified cache management policy. Flow moves from operation 308 to operation 309. As illustrated in FIG. 5, the node file system 510 includes a data cache 512 for caching the files based on instructions provided by the caching module 453.

In one embodiment, the caching policy provided by the caching module 453 indicates that certain types of source files should be cached across jobs. For example, during the build process, certain types of files such as header files (typically identified by the extension '.h') are used frequently across multiple jobs but rarely modified. Accordingly, in one embodiment, the cache management module 451 instructs the nodes to cache these files across multiple jobs. By contrast, other types of files such as object files (typically identified by the '.o' extension) are written once and not frequently used across different jobs. Thus, in one embodiment, the cache management module 451 instructs the nodes 210-215 to flush these files from cache 512 following each job.

In one embodiment, the caching module 453 analyzes the Makefile, supplemental usage data, construction rules 460 and/or the job graph 461 generated by the scheduler 457 to determine precisely which files will be needed at the nodes throughout the course of a build. Assuming that the dependency information and/or job schedule is accurate, this analysis will provide the caching module 453 with an indication of which files are used across multiple jobs and which files are not. Various additional types of data may be factored into the cache management policy implemented by the caching module 453 while still complying with the underlying principles of the invention (e.g., the supplemental usage data provided by the nodes; the size of each file with relatively large files being flushed more frequently to conserve space; whether the files are listed on a prerequisites list, . . . etc).

In one particular embodiment, files are divided into two groups: "shared" and "volatile." Each of the nodes 210 is configured to cache shared files across jobs and to flush volatile files from the cache 512 after each job. In one embodiment, all files are initially tagged as volatile. If the cache management module 451 identifies more than one reference to a file then it moves the file to the shared group. In one embodiment, if a file in the shared group is modified, the caching module 453 returns the file to the volatile group and it can never be shared again. Furthermore, if a shared file is modified then every node must flush its shared group at the end of the current job (i.e., to ensure that a cached, out-of-date version of the file is not used at a job). With this approach, shared files such as header files are cached, while source files and object files may be flushed after each job.

The foregoing two-group approach for cache management yields a simple yet effective implementation where the caching module 453 doesn't need to continually keep track of which nodes cache which files. The caching module 453 simply identifies to the agent 500 which group a file is in. Then at the end of each job, the caching module 453 identifies to the agent 500 which groups must be flushed. In one embodiment, the agent 500 segregates files in different groups to make the flushing operation operate more efficiently.

Of course, the underlying principles are not limited to a two-group caching approach. For example, as mentioned above, in one embodiment, other variables such as file size may be factored into caching decisions. For example, if a file in the "shared" group is above a certain size, then the caching module 453 may instruct the nodes to flush the file to conserve space, notwithstanding its "shared" designation. Alternatively, files above a certain threshold size may simply be marked as "volatile," and therefore automatically flushed by the nodes.

In one embodiment, the cache management module 451 does not flush a file during a job; rather, only after the job completes. Alternatively, files may be flushed during the execution of each job. This is one consequence of the technique of freezing the file system state for each job when it begins (as described below). According to one embodiment of the invention, the registry keys and values stored in the virtual registry 514 are cleared following completion of a job.

Following the execution of jobs, the central build module invokes a "terminator" module 402 shown in FIG. 4a which analyzes the usage information to detect and correct the out-of-order execution of jobs (hereinafter "conflicts") prior to writing the job results to the central database 410 or committing the jobs to the registry 480. For example, if an early job reads a particular file and a later job modifies the file, this indicates that the jobs were run in the wrong order, and also indicates that the Makefile is inaccurate. Thus, at operation 309, a terminator process is implemented for each job that was executed.

FIG. 3b illustrates a process implemented by one embodiment of the terminator module 402 to evaluate and correct the results of each job (referred to generally as "Job N"). In one embodiment, the terminator module 402 evaluates the jobs in the sequential order in which the jobs complete. The terminator module 402 illustrated in FIG. 4a is comprised of a conflict detection module 404 for detecting conflicts and a conflict resolution module 406 for correcting the conflicts. At 312, the terminator 402 invokes its conflict detection module 404 to determine if "Job N" created a conflict. Flow moves from block 312 to block 314 where the conflict detection module determines whether there is a conflict. Exemplary conflict detection mechanisms will be described in greater detail later herein. Additionally, FIGS. 16a-b, which will be described in greater detail later herein, illustrate exemplary enhancements of the conflict detection module according to one embodiment of the invention. If there is not a conflict, flow moves to block 316 where the results of Job N are committed to the central file repository (e.g., the central file repository 410) and/or to the registry (e.g., the registry 480), and the terminator module 402 moves to the next job in the sequence. However, if a conflict is detected, then flow moves to block 320. According to one embodiment of the invention, operations 320-328 (described below) are performed by the conflict resolution module 402 to resolve the conflict.

In one embodiment, the conflict detection module 404 uses two measures of time/order to detect conflicts. The first measure is clock time, which reflects the actual order in which events occur. Each job has a start time and a stop time, both of which are clock times. Several jobs can have the same start time, but exactly one job has a given stop time. The file versions or registry entry versions seen by a job are determined by its start time: once a job has started, file modifications or registry entry modifications made by other jobs will not be visible to the job (e.g., the state of the file system and the registry is frozen for each job when it begins). Conversely, no modifications made by a job are made available to other jobs until the job completes. Moreover, in one embodiment, file updates to the central file repository 410 are atomic: either all of a job's modifications are made available to other jobs, or none of them. Similarly, in one embodiment of the invention, registry updates to the registry 480 are atomic. This approach requires the versioning file system 407 to maintain multiple versions of each file and registry entry (keys and values), and to pass different versions to different jobs. The mechanism used by the versioning file system 407 for tracking file versions and/or registry entry versions is described below.

The second measure used by the conflict detection module 404 is sequential order, the order in which jobs would execute in a sequential build. The conflict detection module 404 uses the sequential order along with file versions and registry entry versions maintained by the versioning file manager 407 to define correctness. In one embodiment of the invention, a parallel build is correct if the file versions or registry entry versions used by each job are the same as those that would be used if the build were executed in sequential order. If a build uses different versions than this, then a conflict generally has occurred. However, in some embodiments of the invention, exemplary described below with relation to FIGS. 16a-b, enhancements to the general conflict detection algorithm above allow for jobs to be run in parallel more aggressively (e.g., in some circumstances even if versions used by a job are not the same as would have been used in a serial build a conflict will not be declared).

Figure 7A:
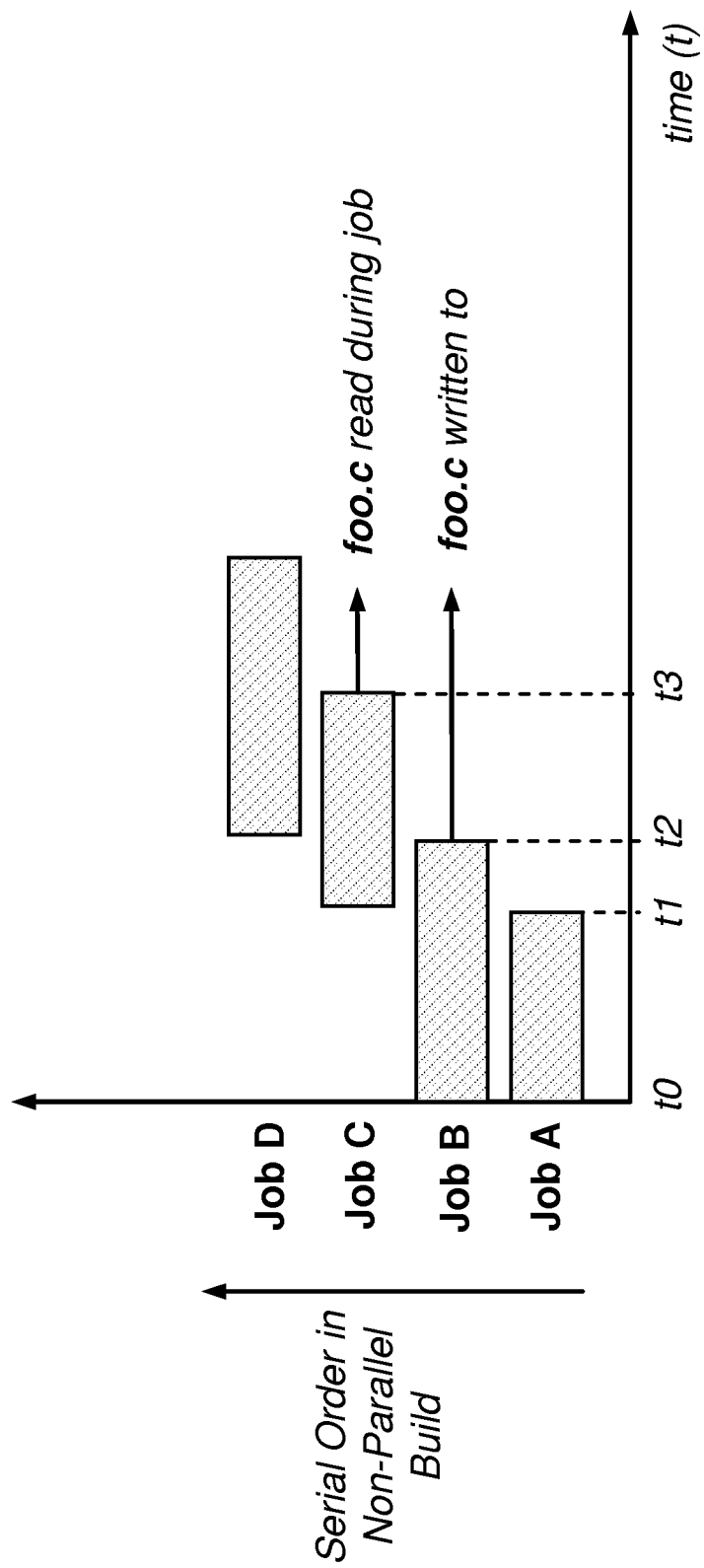
FIGS. 7a-b graphically illustrates a conflict generated on a distributed build system.
Figure 7B:
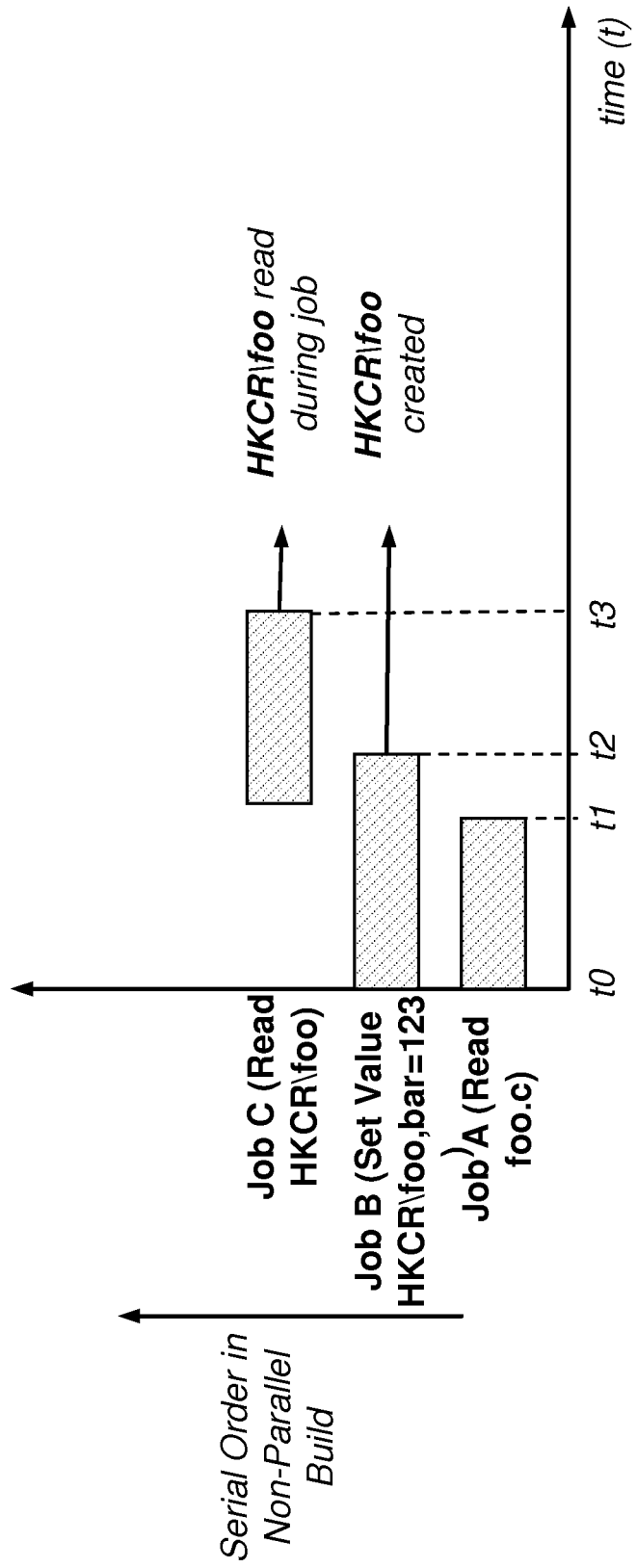

The concept of the general conflict detection mechanism is illustrated graphically in FIGS. 7a-b. FIG. 7a shows four jobs A, B, C, and D executed over time (i.e., time progresses moving towards the right on the horizontal axis). For the purpose of simplicity, this example assumes that there are two nodes available to concurrently process jobs. It also assumes that, if the build were to be executed in a non-parallel manner, the sequential ordering of jobs would be A, B, C, and D. Jobs A and B both start at time t0 and execute in parallel. This indicates that, after analyzing the dependency information in the Makefile, the central build module 400 determined that Jobs A and B are mutually independent, and can therefore be executed in parallel. Job A completes at time t1, freeing one of the two nodes to process Job C (which may start shortly after t1 due to system latency). Like the decision with respect to Jobs A and B, the central build module 400 allows Jobs B and C to run in parallel because the Makefile shows Jobs B and C to be mutually independent. Job B completes at time t2, freeing up the second of the two nodes to process Job D (which, again, may start shortly after t2).

As indicated in FIG. 7a, when Job B completes at time t2, the usage data provided by the node file system 510 indicates that the file foo.c was modified during Job B's execution. Moreover, when Job C completes at time t3, the usage data indicates that foo.c was read and used to generate the target file of Job C. By comparing the version of foo.c actually used by Job C (i.e., the version of foo.c available at time t1) with the most recent version of foo.c, which would have been used in a sequential build (i.e., the version of foo.c modified by Job B), the conflict detection module 404 generates a conflict. In one embodiment, the conflict detection module 404 compares the "last modified" timestamp of foo.c with the start time of Job C to detect the conflict. Rather than using timestamps, in one embodiment, an internal version number is maintained by the versioning file system 407 for each file version. Each version number associated with a file identifies the particular operation that created it which, in turn, provides an indication of when the version came into existence.

FIG. 7b shows three jobs A, B, and C executed over time in a similar fashion as described above with reference to FIG. 7a. If the build were to be executed in a serial manner, the sequential ordering of jobs would be A, B, and C. Jobs A and B both start at time t0 and execute in parallel. Job A is unrelated to job B (job A reads foo.c, while job B creates the registry key HKCR\foo. Job A completes at time t1, and job C begins to run.

As indicated in FIG. 7b, when Job B completes at time t2, the registry usage data provided by the node file system 510 indicates that the registry entry HKCR\foo was created during Job B's execution. Moreover, when Job C completes at time t3, the registry usage data indicates that HKCR\foo was read. By comparing the version of HKCR\foo actually used by Job C (i.e., the version of HKCR\foo available at time t1 (which is non-existent)) with the most recent version of HKCR\foo, which would have been used in a sequential build (i.e., the version of HKCR\foo created by Job B), the conflict detection module 404 generates a conflict. In one embodiment, the conflict detection module 404 compares the "last modified" timestamp of HKCR\foo with the start time of Job C to detect the conflict. Rather than using timestamps, in one embodiment, an internal version number is maintained by the versioning file system 407 for each registry entry version.

Figure 15:
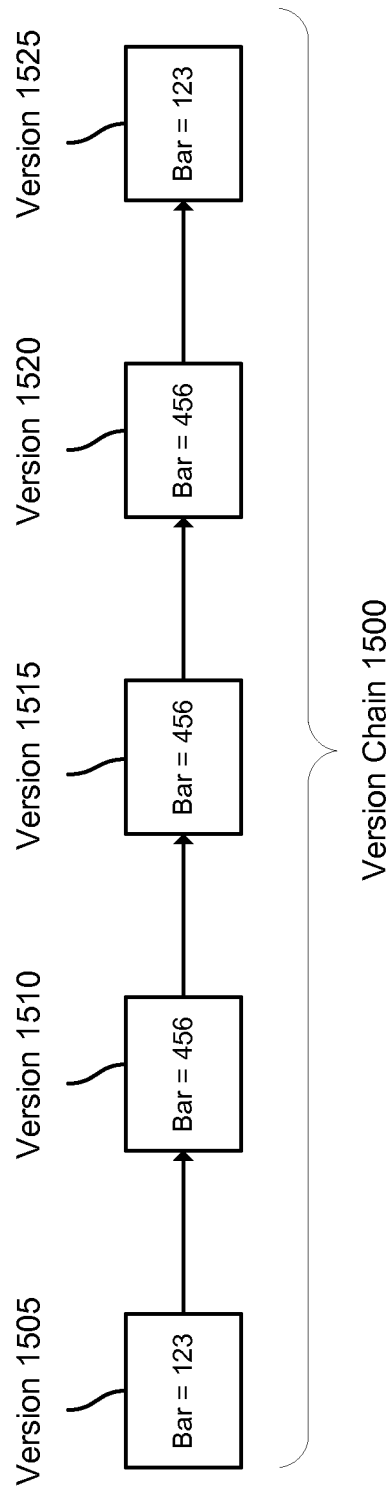
FIG. 15 illustrates a version chain for a particular registry entry according to one embodiment of the invention.
Figure 16A:
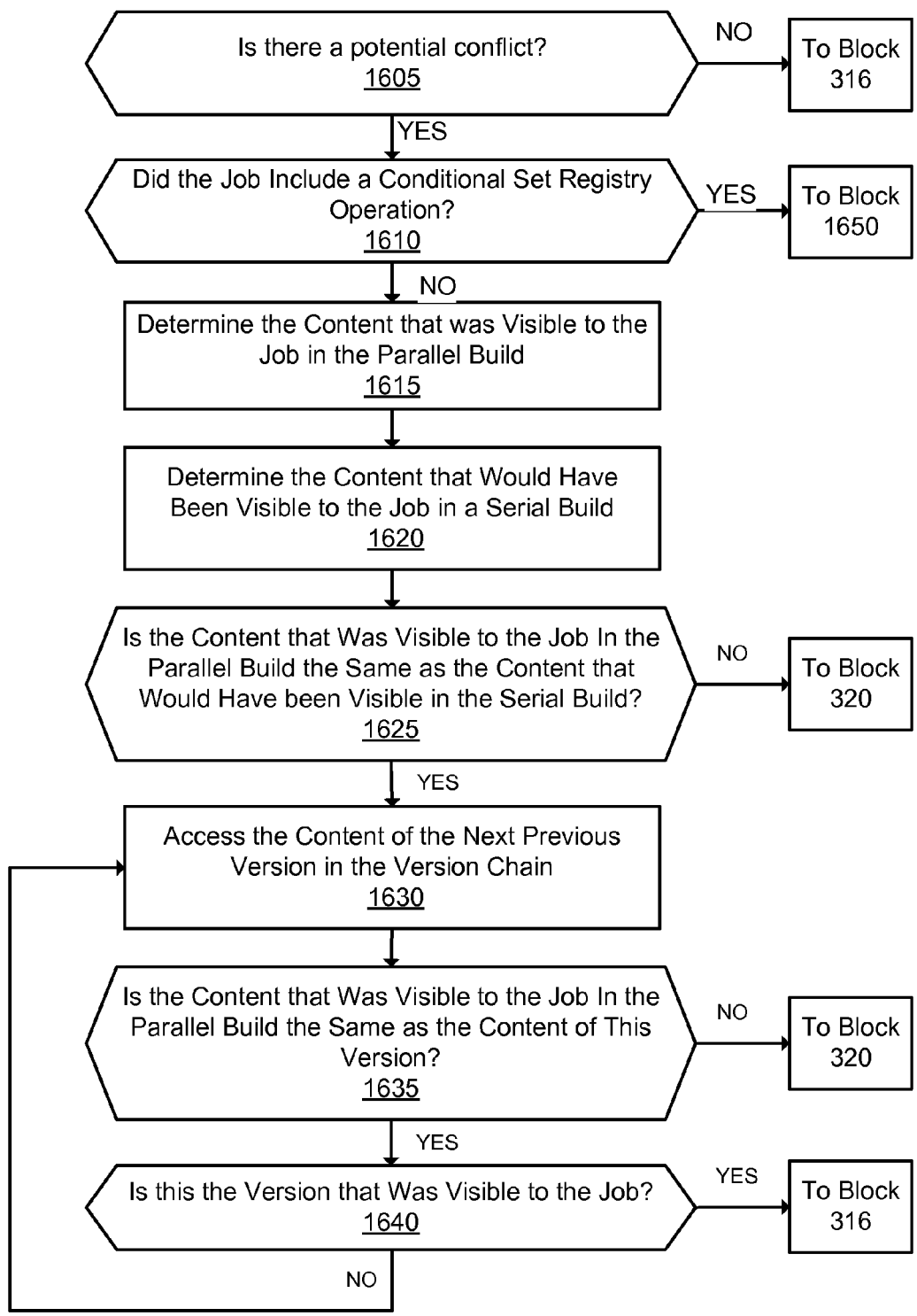
FIGS. 16a-b are flow diagrams exemplary illustrating enhancements to conflict detection according to one embodiment of the invention.
Figure 16B:
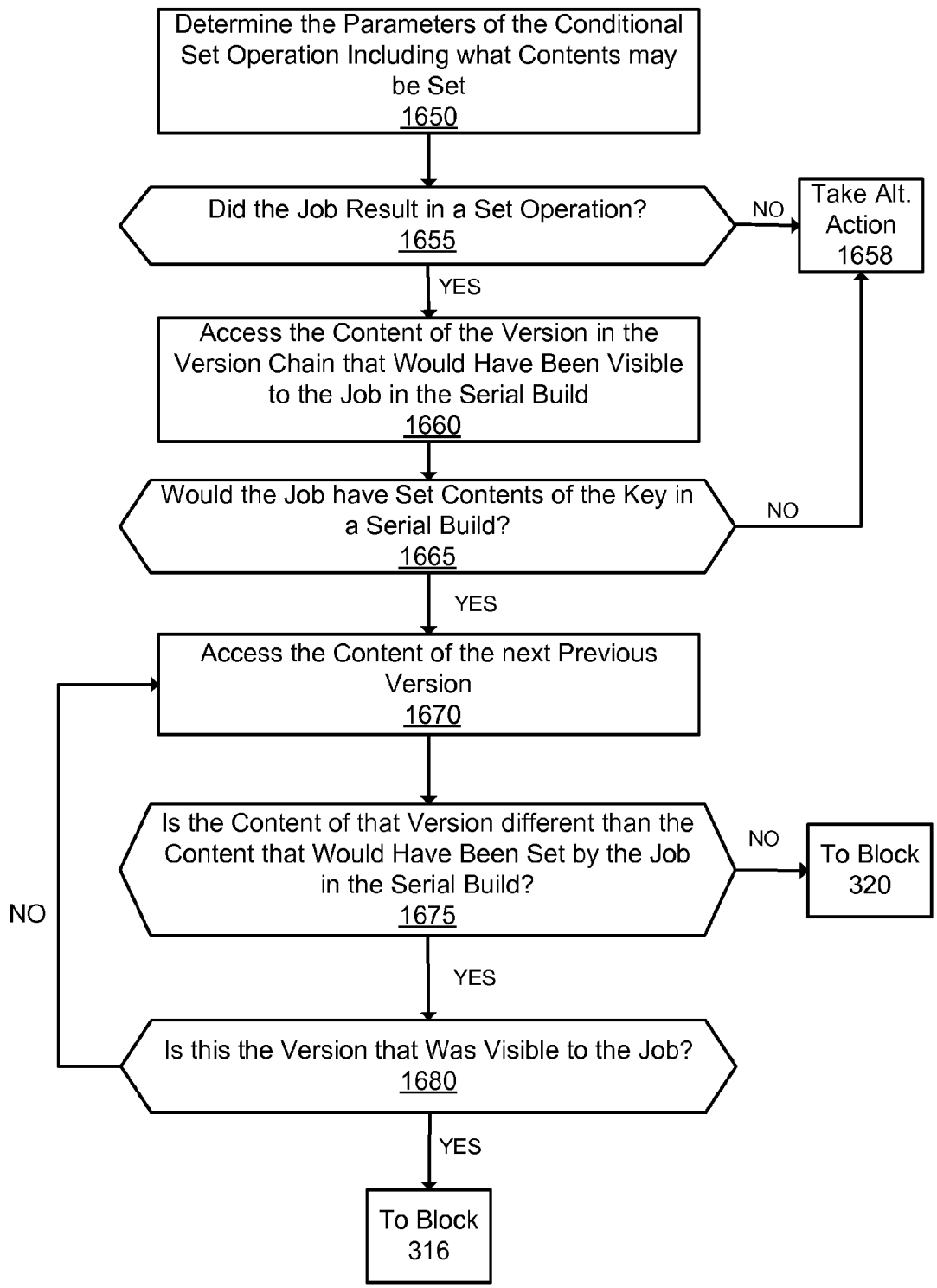

FIGS. 16a-b are flow diagrams illustrating enhancements to the conflict detection mechanism according to one embodiment of the invention. According to one embodiment of the invention, the operations of FIGS. 16a-b are performed by the conflict detection module 404 (e.g., during operation 314 of FIG. 3b). FIG. 16a will be described with reference to FIGS. 14 and 15.

Figure 14:
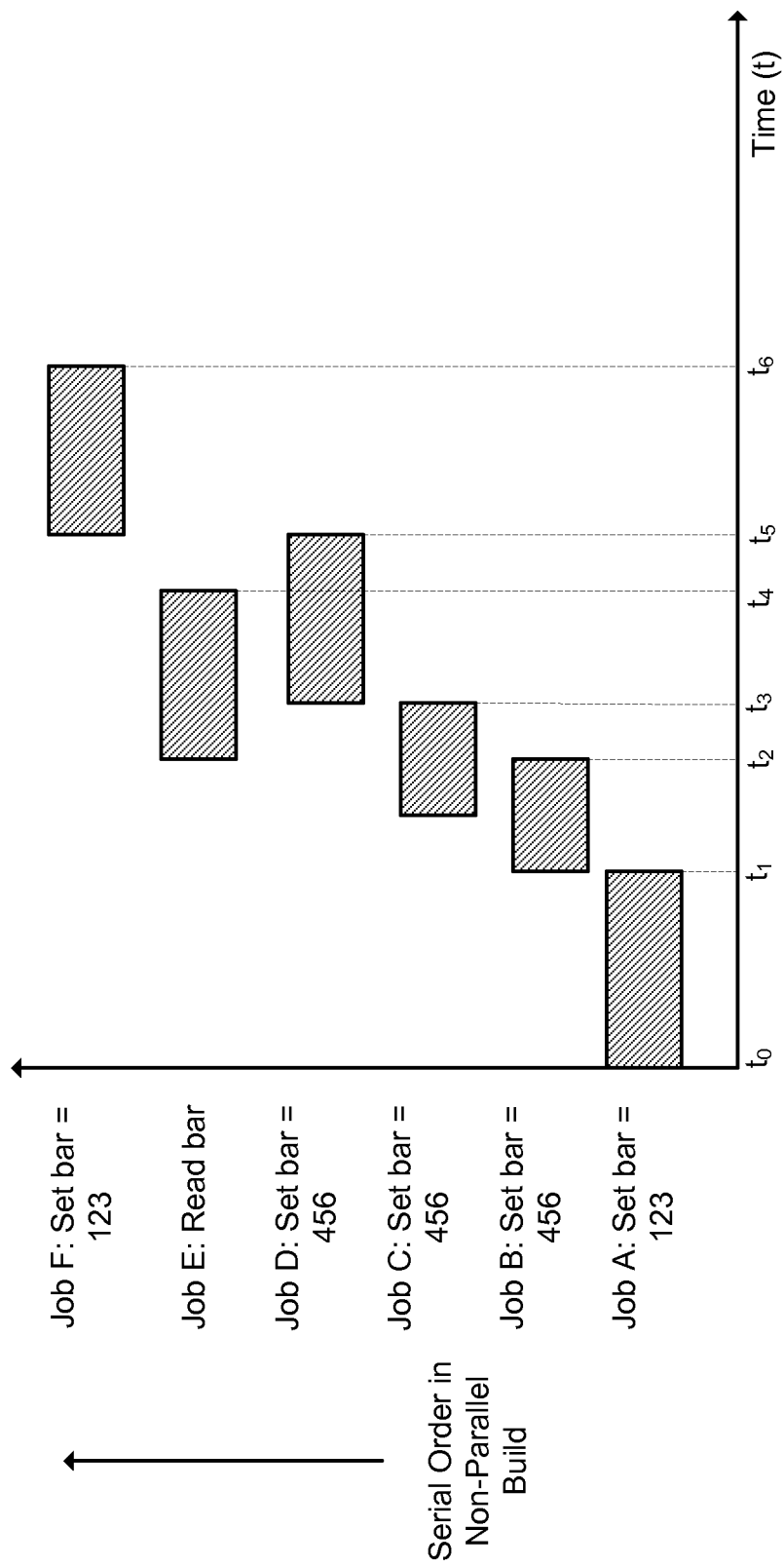
FIG. 14 illustrates a number of jobs including registry operations executed over time according to one embodiment of the invention.

In some builds, the same files and/or registry entry values will be updated to the same content by multiple jobs. An example of this is illustrated in FIG. 14. FIG. 14 shows six jobs, A, B, C, D, E, and F executed over time. If the jobs were to be executed in a serial build, the sequential ordering of jobs would be A, B, C, D, E, and F. Job A sets the registry entry value HKCR\foo, bar to 123. Jobs B, C, and D each set the registry entry value HKCR\foo, bar to 456. Job E reads the value of HKCR\foo, bar, and job F sets the value of bar to XYZ. Thus, jobs B, C, and D each set the content of the registry entry value HKCR\foo, bar to 123. In a serial build, job E would be required to wait until job D has completed. However, in some embodiments of the invention job E does not need to wait until job D has completed.

FIG. 14 illustrates that in the parallel build, the ordering of jobs is A, B, E, C, D, and F. Thus, job E runs out of order with respect to its sequential order. Thus, job E runs before, and does not see the result of, job D. With reference to FIG. 16a, at operation 1605, a determination is made whether there is a potential conflict. According to one embodiment of the invention, a potential conflict exists when versions (either file versions or registry entry versions) used by each job are not the same as would have been used if the build were executed in sequential order. If there is not a potential conflict, then flow moves to block 316. However if there is a potential conflict, then flow moves to block 1610. With reference to FIG. 14, since job E was run before job D, there is a potential conflict.

At operation 1610, a determination is made whether the job included a conditional set registry operation. Some build tools employ a conditional set registry operation where they will write content of a value only if that content is not already set to that content. For example, a conditional set registry operation may set the content of the value HKCR\foo,bar to 123 if the content is not already 123. If the content is 123, then no write operation will be performed. A conditional set registry operation may include a read operation (to read the content of the value) immediately followed by a set operation. If there is a conditional set operation, then flow moves to block 1650, which is described in FIG. 16*b*. If there is not a conditional set operation, then flow moves to block 1615.

At block 1615, the content that was visible to the job in the parallel build is determined. FIG. 15 illustrates a version chain 1500 which corresponds to the jobs illustrated in FIG. 14. Version 1505 corresponds with job A, version 1510 corresponds with job B, version 1515 corresponds with job C, version 1520 corresponds with job D, and version 1525 corresponds with job F. Job E, which is a read operation of HKCR\foo, bar, sees the version 1510 (it was executed prior to jobs C, D, and F). Thus, the content that was visible to job E during the parallel build indicates that the content of the registry entry value HKCR\foo,bar is set to 456. Flow moves from block 1615 to block 1620.

At block 1620, the content that would have been visible to the job in the parallel build is determined. According to one embodiment of the invention, the conflict detection module analyzes the version chain for that registry entry to determine what the content would have been used by that particular job if the jobs would have been run in serial order. As illustrated in FIG. 15, the content of the value that would have been visible to the job E in a serial build is 456 (the same content that was visible and used by the job in a parallel build). For example, in a serial build, job E would have used the content within version 1520. Flow moves from block 1620 to block 1625.

At block 1625, a determination is made whether the content that was visible to the job in the parallel build is the same as the content would have been visible to the job in the serial build. For example, a comparison is made between the content that was used by a job in the parallel build with the content that would have been used by the job in a serial build. If the content is the same, then flow moves to block 1630. If the content was not the same, then flow moves to block 320. As described above, the content of the value used by job E in the parallel build is the same as the content that job E would have used in the serial build.

At block 1630, the content of the next previous version in the version is chain is accessed to determine its contents. With reference to FIG. 15, the content in the version 1515 is accessed. Flow moves from block 1630 to block 1635, where a determination is made whether the content that was visible to the job in the parallel build is the same as the content of this version. For example, a comparison is made between the content that was used by the job and the content within this version. With reference to FIG. 15, the content used by job E was 456 and the content of the version 1515 is also 456. If the content is the same, then flow moves to block 1640. If the content is not the same, then flow moves to block 320. At block 1640, a determination is made whether this version was the version that was visible to the job. If this is not the version that was visible to the job, then flow moves to back to block 1630. If this is the version that was visible to the job, flow moves to block 316 and a conflict is not declared.

Although FIG. 16*a* was described in reference to a registry entry, similar operations may be used when determining conflict of files. Unlike registry entry values, some files do not have simple content. For example, certain files may have attributes associated with those files. According to one embodiment of the invention, a checksum is used to determine whether the content within the versions is the same (e.g., whether the content of one file is the same as the content of another file).

Thus, it should be seen that job E may be run prior to job D even though it is run out of serial order. It should be understood that this allows for a more aggressive parallel build. According to one embodiment of the invention, this allows for read operations to serialize against the first write operation that sets the content to the same value that would have been seen if the build was performed serially. According to one embodiment of the invention, a conflict will not be declared if the content used by a particular job in a parallel build is the same as the content that the job would have used in a serial build.

FIG. 16*b* is a flow diagram illustrating exemplary operations for another conflict detection enhancement according to one embodiment of the invention. In particular, the operations of FIG. 16*b* will apply if there is a conditional set registry operation. As described above, certain build tools will set the contents of a value in the registry if that particular content is not already set. While in one embodiment of the invention the conditional set registry operations described in reference to FIG. 16*b* are applied to all paths matching those in the virtual registry, in alternative embodiments of the invention these operations are applied to only a portion of the paths of the virtual registry (e.g., those within the path HKCR\TypeLib\<GUID>\Interface, null). FIG. 16*b* will be described with reference to FIGS. 17 and 18.

Figure 17:
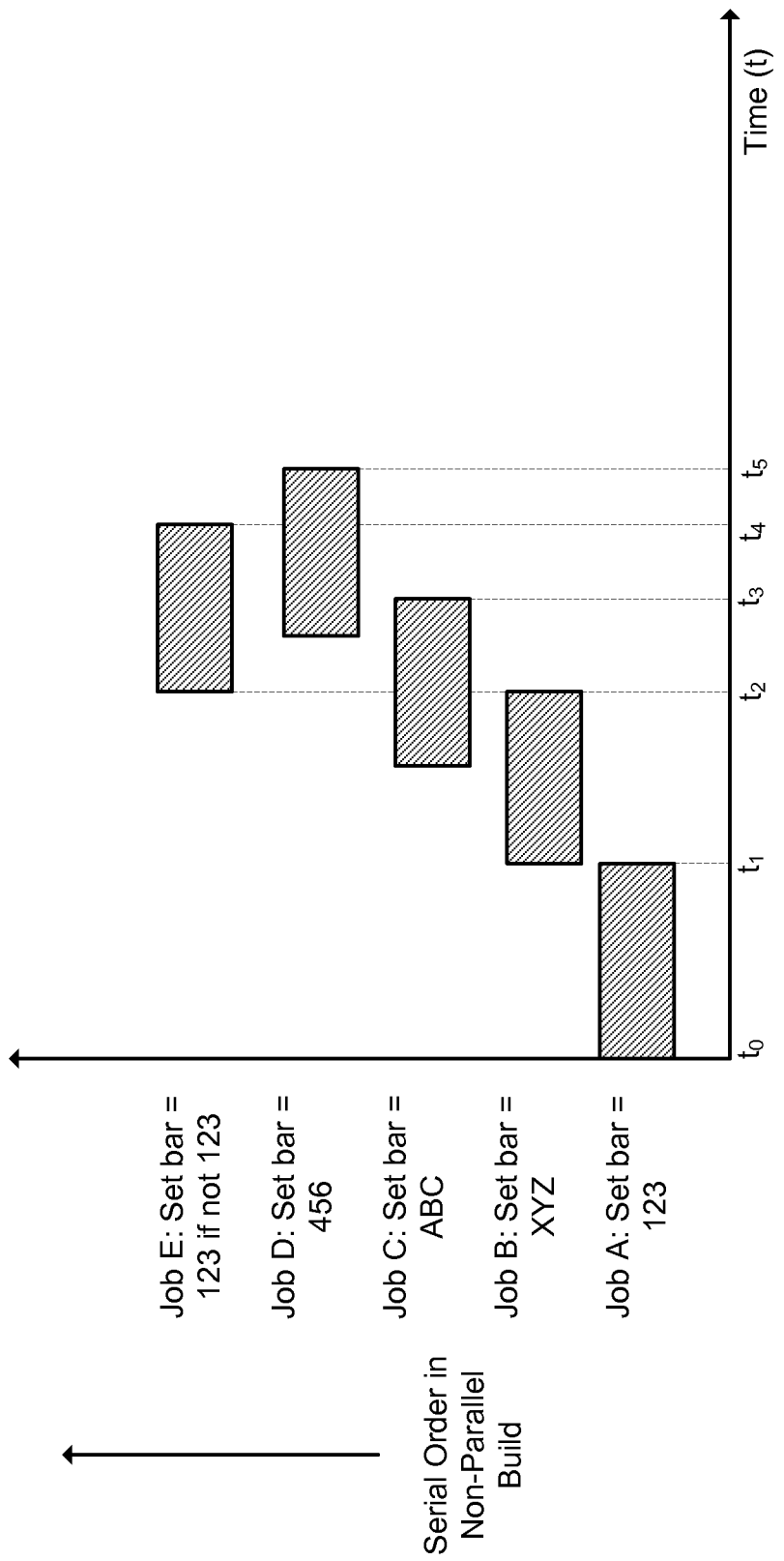
FIG. 17 illustrates a number of jobs including registry operations executed over time according to one embodiment of the invention.

FIG. 17 shows five jobs, A, B, C, D, and E executed over time. If the jobs were to be executed in a serial build, the sequence of jobs would be the following: A, B, C, D, and E. Job A sets the content of the value BAR to 123, job B sets the content of the value BAR to XYZ, job C sets the content of the value BAR to ABC, job D sets the content of the value BAR to 456, and job E is a conditional set registry operation to set the content of the value BAR to 123 if not already set to 123. Since in a serial build job E would wait for the results of job D before running, and job D sets the value BAR to 456, job E would set the value of BAR to 123.

In the exemplary parallel build of FIG. 17, the ordering of jobs is A, B, C, E, and D. Thus, job E runs out of order with respect to its sequential order. That is, job E does not see the result of job D prior to running. For the purposes of the following discussion, it is assumed that the conflict detection module is determining whether the running of job E in FIG. 17 has resulted in a conflict. With reference to FIG. 16*b*, at operation 1650 the parameters of the conditional set operation, including what contents may be set, are determined. For example, job E includes a conditional set registry operation to set the content of the value BAR to 123 if it is not already set to 123. Flow moves from block 1650 to block 1655.

At block 1655, a determination is made whether a set operation resulted in execution of the job in the parallel build (i.e., whether the conditional set operation resulted in the setting of the content of the value). If the job did not result in a set operation, then flow moves to block 1658 where alternative action is taken (e.g., a conflict is declared). However, if the job resulted in a set operation, then flow moves to block 1660. With reference to FIG. 17, the execution of job E resulted in a set operation since at the time job E ran, the content of the value BAR was not set to 123 (e.g., it was set to XYZ). At block 1660, the content of the version in the version chain that would have been visible to the job in a serial build is accessed and read.

Figure 18:
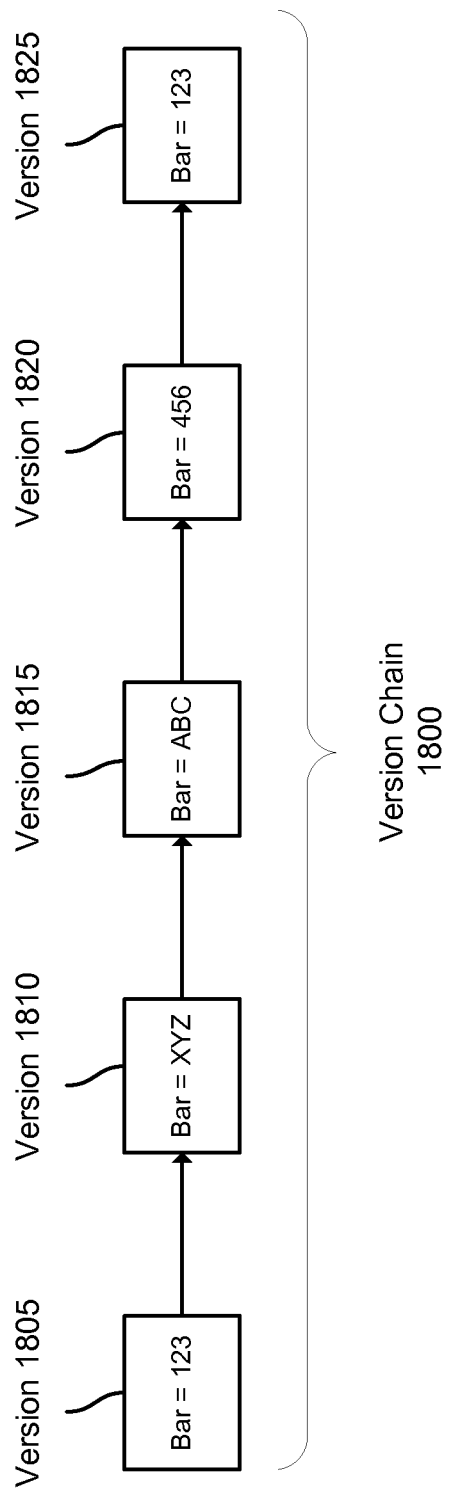
FIG. 18 illustrates a version chain for a particular registry entry according to one embodiment of the invention.

FIG. 18 illustrates a version chain 1800 that corresponds to the jobs illustrated in FIG. 17 if the jobs would have been run in a serial order. The versions 1805, 1810, 1815, 1820, and 1825 correspond with the jobs A, B, C, D, and E respectively. The content of the version in the version chain that would have been visible to the job in the serial build would have been BAR=456. Flow moves from operation 1660 to block 1665, where a determination is made whether the job would have performed the set operation in a serial build. If the job would not have performed a set operation in a serial build, then flow moves to block 1658 where alternative action is taken. However, if the job would have performed a set operation in the serial build, then flow moves to block 1670. With reference to FIG. 18, since job D sets the value BAR to 456, in a serial build job E would have performed a set operation to set the value of BAR to 123.

At block 1670, the content of the next previous version is accessed. For example, with reference to FIG. 18, the content of version 1815 is accessed and read. Flow moves from block 1670 to block 1675 where a determination is made whether the content of that version is different than the content that would have been set by the job. In other words, a determination is made whether the contents of this version is different than the content that is to be conditional set by the job. If so, then flow moves to block 1680. However, if the contents are the same, then flow moves to block 320. With reference to FIG. 18, the content of the version 1815 (BAR=ABC) is different than the content that is to be conditional set by the job (BAR=123). At block 1680, a determination is made whether that version was the version that was visible and used by the job. If it was the version used by the job, then flow moves to block 316 and a conflict will not be declared. If the version was not the one visible to the job, then flow moves back to block 1670. With reference to FIG. 18, the version 1815 is not the version that was used by job E \(\job E used version 1510). However, it should be seen through the next iteration of operations 1670 and 1675, that a conflict will not be declared for job E.

Thus, it should be seen that job E may be run prior to job D even though it is run out of serial order. It should be understood that this allows for a more aggressive parallel build. According to one embodiment of the invention, this allows for conditional set operations to serialize against a first version of a string of versions having a value set to different content (content that would result in the job performing a write operation) as long as there are not intervening versions between the first version and the version that the job would have used in a serial build that have content that would not have resulted in the job performing the write operation.

Returning to FIG. 3b, at operation 320, once a conflict has been detected, the conflict resolution module 406 invalidates the incorrect versions (either incorrect file versions or incorrect registry entry versions depending on the conflict) resulting from the job that generated the conflict via the versioning file system 407, and identifies the correct versions needed to correctly re-execute the job. Returning to the example illustrated in FIG. 7a, the versioning file system 407 stores the new version of foo.c generated by Job B once Job B has completed. Thus, in response to the detected conflict associated with Job C, the conflict resolution module 406 requests the correct version of foo.c from the versioning file system 407. In one embodiment, the conflict resolution module 406 provides the versioning file system 407 with an indication of the start time of Job C (t1), which the versioning file manager 407 uses to identify the correct version (i.e., the version that Job C would have used in a non-parallel build). More specific details of query and lookup operations performed by one embodiment of the versioning file system 407 are set forth below.

Once the correct versions have been identified, the conflict resolution module 406 must re-execute the job which resulted in the conflict. Thus, at 322 in FIG. 3b, the conflict resolution module 406 places the job at the front of the work queue 408, ahead of all other pending jobs. In one embodiment, to ensure that subsequent jobs do not generate additional conflicts resulting from the initial conflict, all other jobs are placed on hold pending the successful execution of the job which resulted in the conflict. Placing all other jobs on hold, however, may be overly pessimistic in many cases (i.e., because it will not generally be likely that subsequent jobs will depend on the invalid results of Job N). At 324 the next available node re-executes the job using the correct file versions and, at 326, the versioning file system 407 stores the results of the job in the central file repository 410 and/or the registry 480 (i.e., assuming no additional conflicts exist).

In one embodiment, the versioning file system 407 stores the different file versions used throughout the build process within a back end file store 411, and stores the different registry entry versions used throughout the build process within the virtual registry store 485. In one embodiment, the back end file store 411 and the registry store 485 are implemented entirely within a high speed memory (e.g., DDR SDRAM) to accelerate file access. However, depending on the size of the program build and/or the capabilities of the build machine 200, the back end file store 411 and the registry store 485 may be comprised of both a high speed memory component and a mass storage component (e.g., a hard drive). In one embodiment, files are split between the high speed memory and mass storage memory based on factors such as the probability that the different file versions will be required again during the course of the build. For example, object files (".o" files) will typically be required in a linking step at some point during the program build. As such, it may make sense to store these files within the high speed memory. By contrast, executable files, which typically represent a final result of a build operation, will not typically be required later in the build process and may therefore be stored within the mass storage memory. Various other factors may be evaluated to determine which files to store within the high speed memory and which files to store within the mass storage memory.

A conflict typically indicates that the information contained within the Makefile is incomplete or inaccurate. For example, if the Makefile used for the build illustrated in FIG. 7a contained completely accurate dependency information, the job scheduler 457 would not have scheduled Job C to run until Job B completed (i.e., an accurate Makefile would have indicated that Job C was dependent on the results of Job B). As such, at 326, following the detection of the conflict, one embodiment of the invention stores supplemental usage data which indicates the dependency. In one embodiment, the supplemental usage data is stored as a log file containing a list of all of the missed dependencies at the end of each build. The job scheduler 457 may then use both the Makefile and the supplemental usage data to create a more precise, efficient job ordering in subsequent builds (e.g., by first evaluating the dependencies within the Makefile and then evaluating the dependencies within the supplemental usage data prior to the initiation of any of the jobs). Moreover, rather than storing the supplemental usage data in a separate log file, the Makefile itself may be automatically amended to include the additional dependency information. Similarly, a supplemental Makefile, formatted as a standard Makefile rather than a generic "log" file, may be automatically generated and used along with the original Makefile in subsequent builds.

In one embodiment, the supplemental usage data stored on the build machine does not merely indicate missed dependencies which result in a conflict, as described above. The usage information also identifies redundant dependencies within the Makefile—i.e., objects listed as being dependent which are not. As such, in subsequent builds, the job scheduler 457 may use this information to run jobs in parallel which would not have been run in parallel using the Makefile alone. Conversely, the usage data may also identify data objects which are dependent but which did not result in a conflict (e.g., because the jobs were simply executed in the correct order by chance). In sum, because each file utilized during the build process is monitored by the node file system 510, the central build module 400 is provided with complete and accurate file dependency information for future builds, thereby significantly enhancing the speed and efficiency of the build process.

Moreover, in one embodiment, the supplemental usage data is not merely used to schedule jobs. Rather, the preload module 452 analyzes the supplemental usage data (in lieu of or in addition to Makefile) to precisely identify the source files needed at each node prior to start of each job. As such, groups of files may be streamed between the central build module 400 and the agents 500, thereby eliminating virtually all of the on-demand fetches that would be required otherwise. As previously mentioned, preloading files in this manner is significantly more efficient than a collection of synchronous agent requests to satisfy cache misses. This architecture not only speeds up the build process but also increases the scalability of the overall system architecture.

Figure 10A:
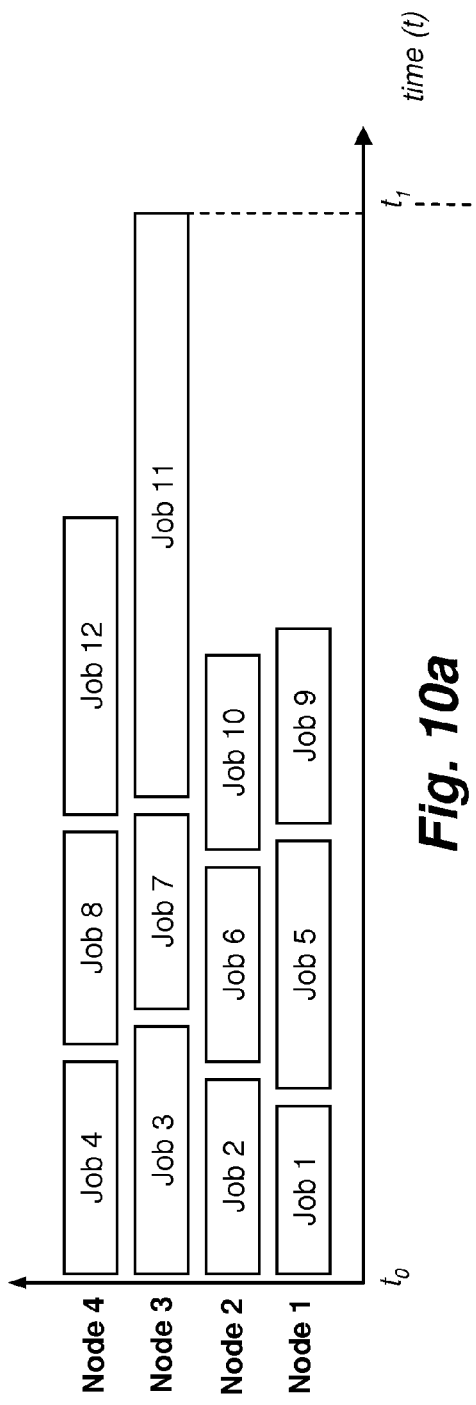
FIG. 10a illustrates a plurality of independent jobs executed on four separate nodes with no consideration to job length.

In one embodiment, the supplemental usage data includes the amount of time each job takes to complete in addition to the file dependency information. This information is then used by the job scheduler 457 in subsequent program builds to schedule jobs more efficiently. As described above, during the course of a program build, numerous jobs may be identified as independent of one another and may therefore be placed together in the work queue. By way of example, and not limitation, FIG. 10*a* graphically illustrates 12 independent jobs processed over time on a system having 4 nodes. Time progresses moving to the right along the horizontal axis. Because the jobs are independent of one another, they may be executed on the 4 nodes in any particular order. One of the Jobs, Job 11, takes significantly longer to process than the remaining jobs. Because the scheduler 457 scheduled Job 11 to be executed later than all other jobs in the group, the system must wait for Job 11 to complete at time t1, before moving on to any subsequent jobs (e.g., because subsequent jobs are dependent on the results of Job 11).

Figure 10B:
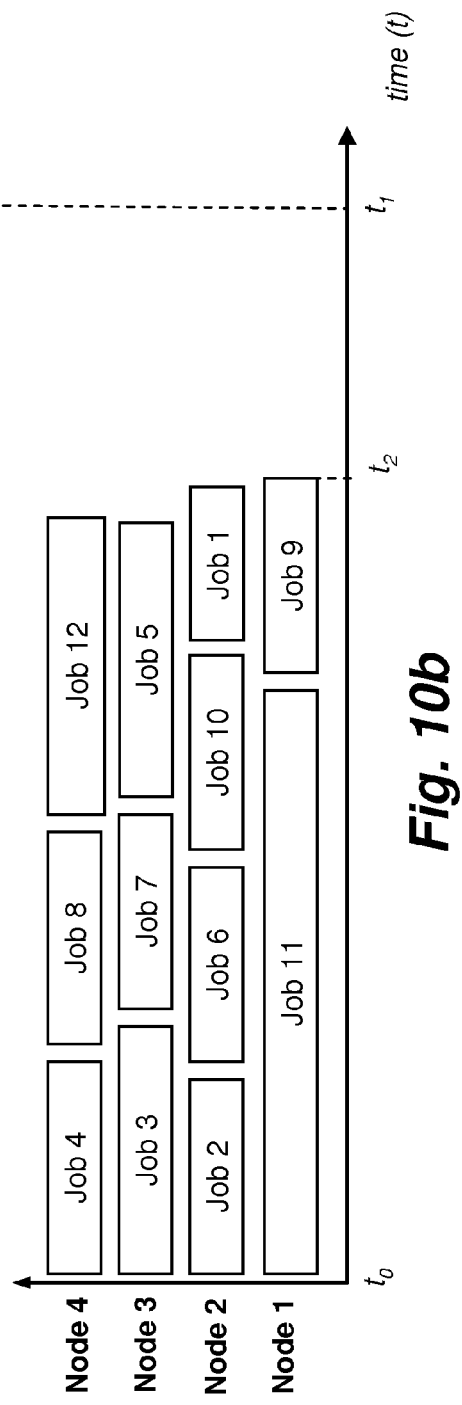
FIG. 10b illustrates the same plurality of jobs executed across four different nodes taking job length into consideration.

By contrast, in the example shown in FIG. 10*b*, after the scheduler 457 analyzes the supplemental usage data which includes the amount of time it takes for each job to complete, the scheduler 457 is able to schedule the jobs to execute in the most efficient order possible. In particular, Job 11 is pushed to the front of the job queue so that Node 1 starts processing Job 11 before all other jobs in the group. As a result, each node remains busy processing jobs until about the same time, t2, which may be significantly less time than the original completion time, t1.

In addition, in one embodiment, the supplemental usage data identifies the processing capabilities of each of the nodes in the cluster. The scheduler module 457 may then analyze this information to pair up relatively low powered nodes with the relatively smaller jobs and relatively higher powered nodes with relatively larger jobs (e.g., such as Job 11 in FIGS. 10*a*-*b*). In this manner, the scheduler module can efficiently schedule jobs within an asymmetric cluster of nodes (i.e., a cluster in which the nodes have disparate processing capabilities).

In one embodiment, the processing capabilities of each node may be measured by running periodic benchmark testing. For example, every day, week, month, etc., the cluster manager 202 and/or build machine 200 may automatically invoke benchmark testing of the processing capabilities of each of the current set of nodes. Moreover, each of the nodes may be configured to conduct benchmark testing on its own and report back to the cluster manager 202 and/or build machine 200 periodically. Alternatively, in one embodiment, at the end of a build, the average time it took for each node complete each of its assigned jobs may be calculated. Assuming that the jobs were randomly distributed to each of the nodes, the average time may provide an accurate indication of the relative processing capabilities of each machine.

As described above, in one embodiment, the versioning file system 407 caches multiple versions of files and/or registry entries during the build process so that, if a conflict is detected, it can identify the appropriate file version and/or registry entry and re-execute the job which created the conflict. In one embodiment, to track file versions, the versioning file system 407 employs a unique file management architecture designed to keep track of two entities over time: file contents and file names. For each regular file there is a content object that describes the attributes and data for the file. The file's data may be cached in memory or stored on disk in the local file system. A name object is a reference to a content object and corresponds to a directory entry. As in operating systems such as Unix that provide hard links, multiple names may exist which refer to the same content. For each directory there is a content object that contains the directory's attributes and a hash table that maps from string file names to name objects.

Figure 8A:
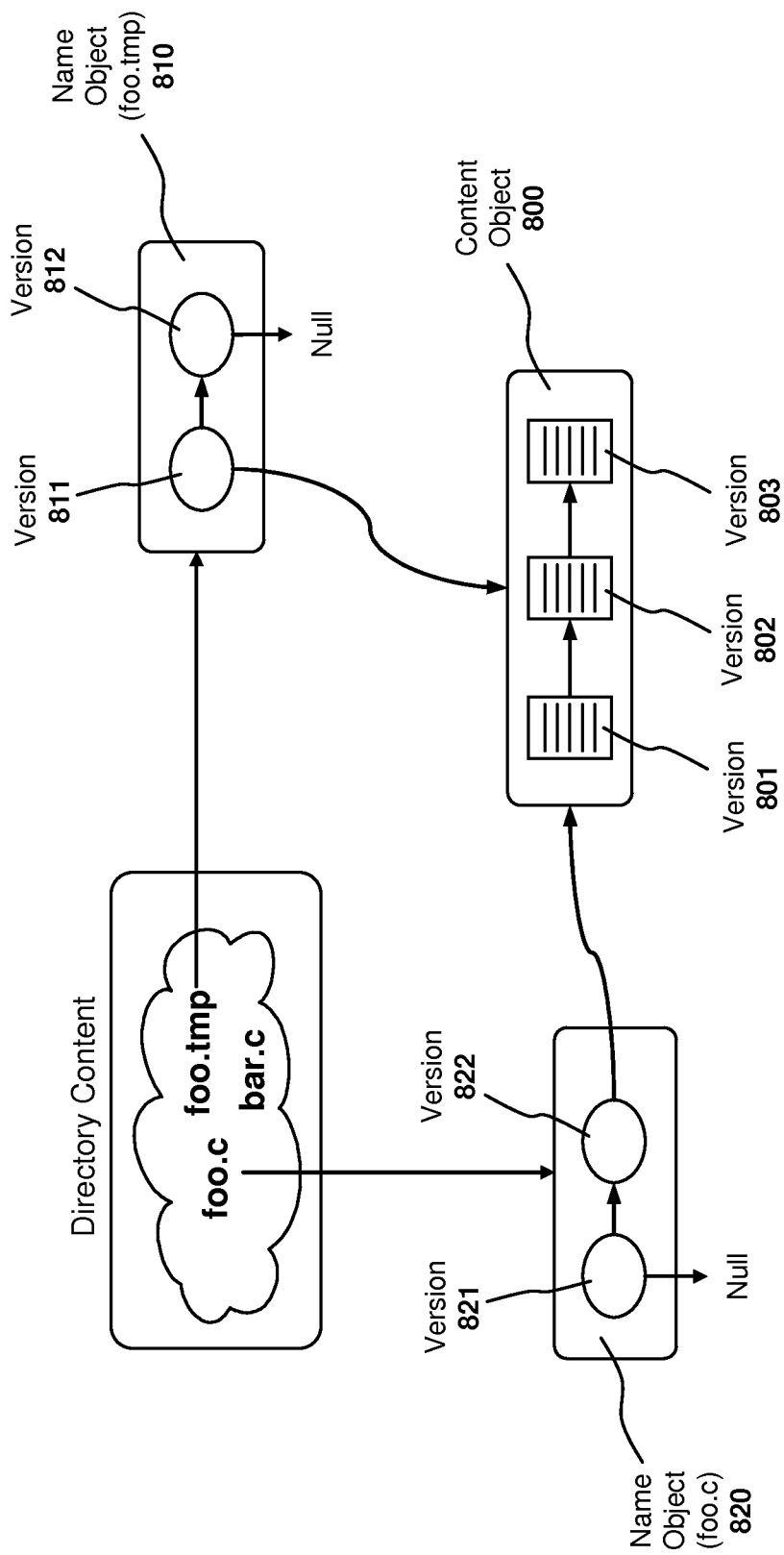
FIGS. 8a-b illustrate content objects and name objects employed by a versioning manager according to one embodiment of the invention.

These concepts are illustrated in FIG. 8*a* which shows a directory with two name objects foo.tmp 810 and foo.c 820 which point to the same content object 800. Over the course of the build, three different versions 801-803 of the content object 800 are generated at three different points in time. Initially, the content object was identified by the temporary name object foo.tmp 810. At this time the name object foo.c pointed to a null object, as indicated by the name object version 821 (i.e., the name was not initially linked with the content object 800). During the course of the build, the name of the file was changed from foo.tmp to foo.c. As a result, a new version 822 of the name object foo.c was generated which pointed to the content object 800 and a new version 812 of the name object foo.tmp 810 was generated which pointed to a null object (i.e., the name object foo.tmp 810 was unlinked from the content object 800).

Figure 8B:
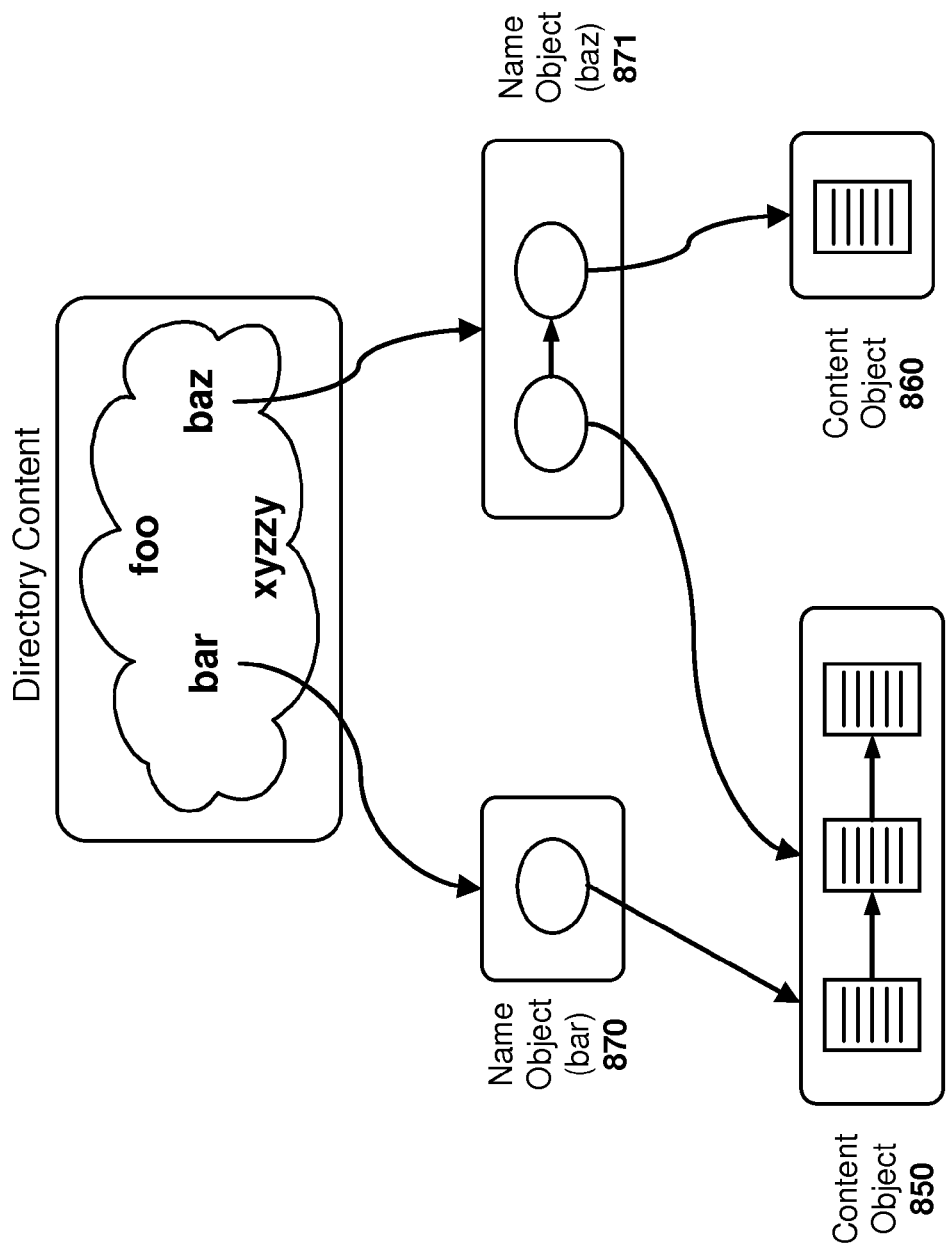

A second example is illustrated in FIG. 8*b* which shows two directory entries bar and baz associated with two name objects 870 and 871, respectively. The two name objects 870 and 871 initially pointed to the same content object 850 which, during the course of the build process, was modified twice since its original version. A later job deleted baz and re-created it with different contents. Thus, the name object baz points to a new content object 860.

As illustrated by the foregoing examples, each name object and content object contains a chain of versions. When a file is modified without first being deleted a new version is added to the content object for the file. When a file is deleted and then re-created, a new version is added to the name for the file; it refers to a new content object for the new file data. In one embodiment, each version identifies the job that created it which, in turn, provides timing information about when the version came into existence. Name version chains also include null versions corresponding to periods of time when the object didn't exist.

In one embodiment of the invention, a directory content object does not contain multiple versions for its content. Instead, it keeps multiple versions for its attributes, plus a hash table with entries for all of the names ever referenced in the directory. The name objects referenced in the hash table have their own version chains which can be analyzed to determine whether they exist at any given point in time.

In one embodiment, the nodes 210-215 are not aware of the different versions used for file names and contents. Rather, at any given time, a node is dedicated to a single job, so it only works with the appropriate file versions for that job. In one embodiment, nodes refer to file names and contents using unique identifiers that correspond to the name objects and content objects. The central build module 400 maps these to its internal data structures and then uses the appropriate version for the node's current job.

In one embodiment, to locate the correct file version, the versioning file system 407 supports two principal query operations: file lookup and data access. The lookup operation is provided with the content object for the directory, the name of a file within that directory, and the job that requested the lookup. The versioning file system 407 must then return the appropriate content object (i.e., the data) associated with the name. To do so, it first looks up the file name in the directory's hash table and then scans the chain of versions for that name. It examines the job that created each version and ignores all versions created by jobs later in sequential order than the current job, as well as versions created by jobs that completed after the current job started. Of the name versions that remain, the latest one in sequential order is used. The file manager returns the content object referred to by that name version.

The data access operation is provided with the identified content object and the job that requested the lookup. Using this information, it scans the version list for the content object, using the same selection criteria as for names. It ignores all versions created by jobs later in sequential order and versions created by jobs that completed after the current job started. Of the content versions that remain, the latest one in sequential order is used.

Figure 8C:
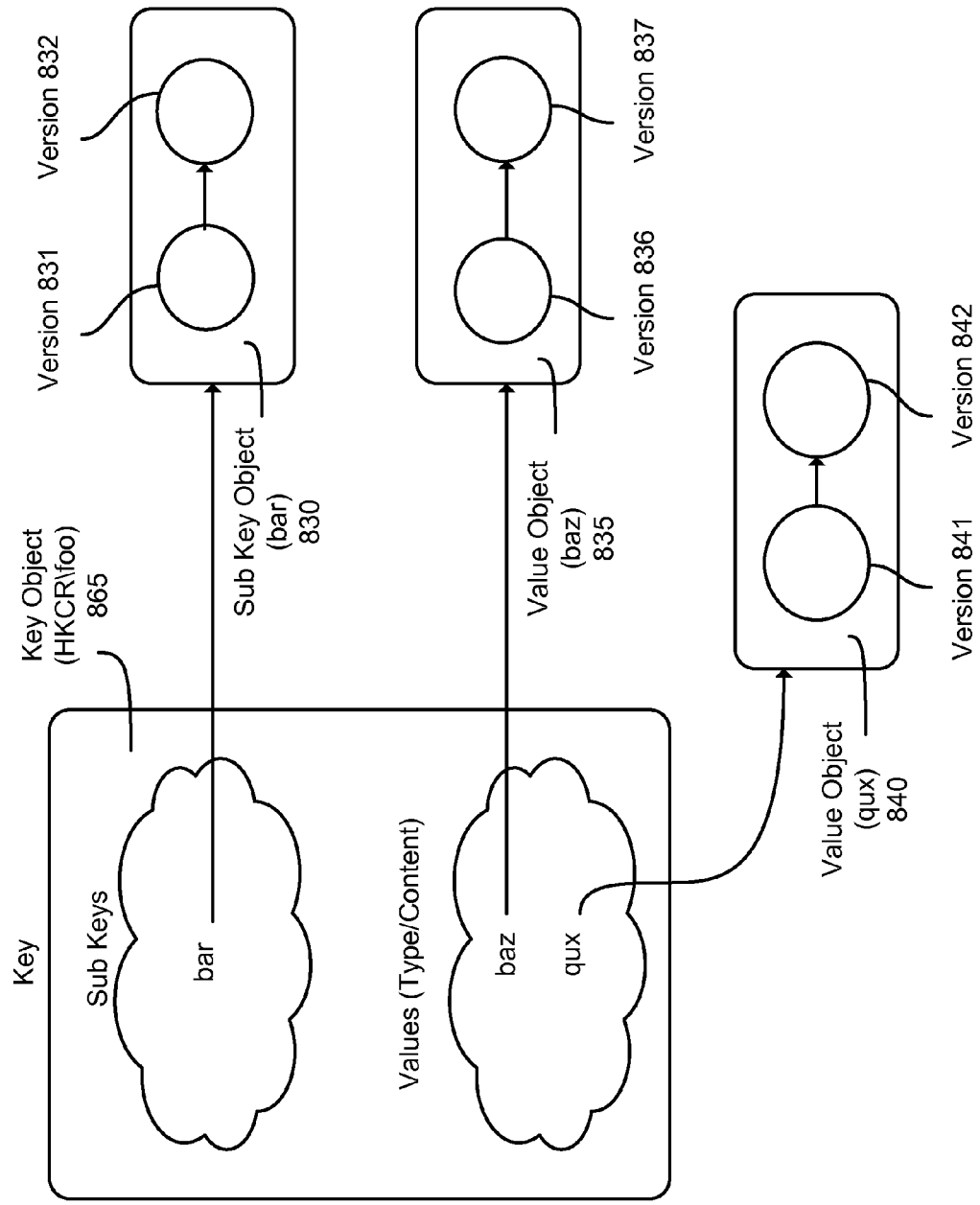
FIG. 8c illustrates key objects employed by a versioning manager according to one embodiment of the invention.

In one embodiment of the invention, to track registry entry versions, the versioning file system 407 employs a unique file management architecture designed to keep track of keys, sub-keys, and values. Each key in the registry may have sub-keys and one or more values (type and content). FIG. 8c illustrates a key object (key object HKCR\foo 865) having one sub-key (e.g., HKCR\foo\bar\) which points to the sub-key object 830, and two values one of which points to the value object 835 and the other points to the value object 840 (e.g., HKCR\foo\baz and HKCR\foo\qux). A sub-key object includes an indication whether it exists or not. A value object includes type and content (e.g., string and value).

Each sub-key object and value object contains a chain of versions. When a sub-key is modified (e.g., created or deleted) a new sub-key version is created and added to the version chain. As illustrated in FIG. 8c, there are two versions (version 831 and 832) in the chain for the sub-key object 830. For example, in version 831 the sub-key object 830 existed and in version 832 the sub-key object 830 was deleted. In a similar fashion, when a value object is modified, a new value object version is created and added to the version chain. As illustrated in FIG. 8c, there are two versions (versions 836 and 837) in the version chain for the value object 835 and there are two versions (versions 841 and 842) in the version chain for the value object 840.

In one embodiment, the nodes 210-215 are not aware of the different versions used for sub-keys and values. Rather, at any given time, a node is dedicated to a single job, so it only works with the appropriate versions for that job. In one embodiment, nodes refer to sub-keys and values using unique identifiers that correspond to the sub-key objects and value objects. The central build module 400 maps these to its internal data structures and then uses the appropriate version for the node's current job.

In one embodiment of the invention, a similar mechanism is used to locate the correct versions of registry entries. For example, for sub-keys, the versioning file system 470 first looks up the sub-key object in the key's hash table and then scans the chain of versions for that sub-key object. It examines the job that created each version and ignores all versions created by jobs later in sequential order than the current job, as well as versions created by jobs that completed after the current job started. Of the sub-key versions that remains, the latest one in sequential order is used. The versioning file system returns that sub-key object. Similarly, for values, the versioning file system 407 looks up the particular value object in the key's hash table and then scans the chain of versions for that value object. It examines the job that created each version and ignores all versions created by jobs later in sequential order than the current job, as well as versions created by jobs that completed after the current job started. Of the value versions that remains, the latest one in sequential order is used.

In one embodiment, the conflict detection module 404 detects conflicts using the same lookup operations described above, except that it uses the current time instead of the job's start time. It then compares this version with the one actually used. In other words, it determines whether the same versions of files would be used if the job were to be executed after all previous jobs in sequential order have finished. If not, then a conflict has occurred.

Almost all software projects contain multiple modules, each with its own Makefile (or other data object containing file dependency information). The Makefiles are typically structured hierarchically, with top-level Makefiles invoking lower-level Makefiles recursively, so that the entire project can be built at once starting with the topmost Makefile. A different Makefile is often used within each subdirectory. The Makefile in a particular directory contains dependency information for the files in that directory alone. During the program build, the Make utility is recursively called to process the Makefiles in each individual subdirectory. Large projects can contain hundreds or even thousands of Makefiles.

Hierarchical Makefiles create unique challenges for parallel builds. Because an independent sequential invocation of Make is made for each Makefile it is difficult to manage concurrency and dependencies across Makefiles. That is, each invocation of Make is a separate process which does not share dependency information with other Make processes. A typical target for invoking lower-level Makes might look something like this:

```
all:
    for dir in dir1 dir2 dir3; do cd $dir; make all; done
```

Unfortunately this will run the lower-level Makes sequentially, reducing the efficiency of the parallel build. The target could be redefined to expose more concurrency, as follows:

```
all: all-dir1 all-dir2 all-dir3
all-dir1:
    cd dir1; make all
all-dir2:
    cd dir2; make all
all-dir3:
    cd dir3; make all
```

However, it is difficult to share the nodes of the cluster among the lower-level Makes to optimize overall performance. In addition, most of the problems with incomplete dependency information result from interactions between Makefiles. It is difficult to detect these interactions when each Makefile is managed by a different process.

For example, if this approach were employed within the distributed architecture illustrated in FIG. 2, it would run each child Make process on a separate node, which would tie up many of the nodes with Make processes. It would also make file management less efficient because the top-level Make would have to pass file data to the child Make, which would then pass it on to each of its jobs. Deeply nested Makes would cause file data to be copied again for each additional level in the hierarchy.

Figure 9:
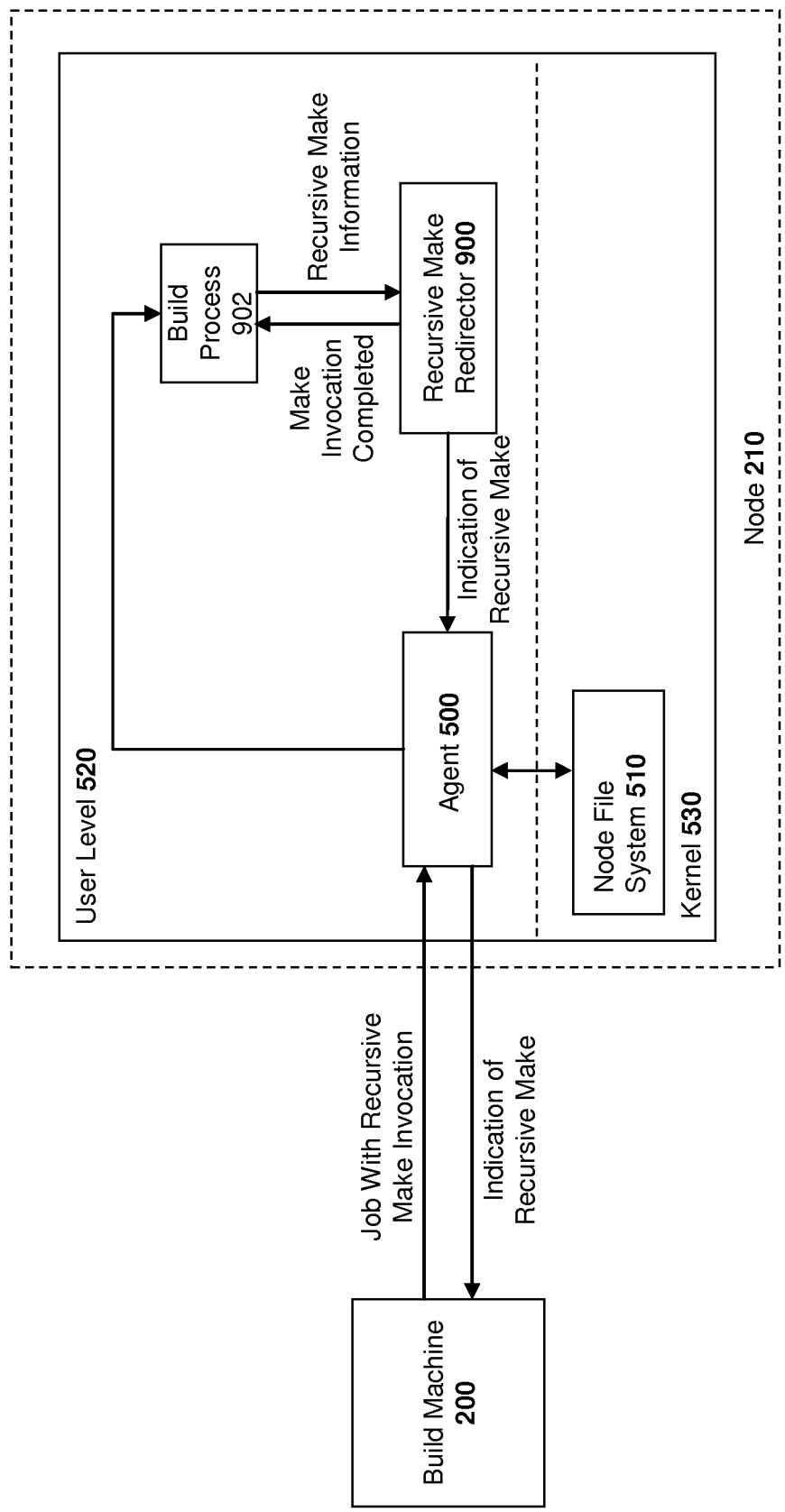
FIG. 9 illustrates a recursive Make redirector module according to one embodiment of the invention.

One embodiment of the invention solves these problems by coalescing all of the nested Makes into one large build handled by the original central build module 400. As illustrated in FIG. 9, a recursive Make redirector 900 is configured on each of the remote nodes. The recursive Make redirector 900 is a stub program which looks like the Make utility to the calling process 902. In one embodiment, when the Make redirector 900 detects that a recursive Make has been invoked (e.g., based on the change in value of a specified environment variable) it extracts the dependency information from the recursive Makefile and transmits it back to the central build module 400 via the agent 500. In addition, it instructs the process 902 that the recursive Make invocation has successfully completed. The process 902 then terminates.

In one embodiment, the recursive Make redirector 900 does not notify the agent directly that a recursive Make invocation has occurred. Rather, the recursive Make redirector 900 stores or modifies a file on the node 210 indicating that a recursive Make invocation has occurred. After the process 902 terminates, the agent 500 searches for the file and identifies the recursive Make invocation by the existence of the file (or the modification of the file). Moreover, in one embodiment, the recursive Make redirector is programmed directly within the agent 500 itself. As such, in this embodiment, "notification" of the agent 500 is not required.

As indicated in FIG. 4b, after the recursive Make information 462 is extracted and transmitted back to the central build module 400, the recursive Makefile information 462 is parsed by the parser 450 and incorporated into the set of construction rules 460. By analyzing the combined dependency information from the construction rules 460, the job scheduler 457 is able to intelligently schedule jobs to each at the nodes in the correct order, thereby consolidating the recursive Makes invocations into a single unified build process. In one embodiment, the construction rules 460 are logically divided into multiple build environments, each characterized by a different Makefile, a working directory, a set of command-line arguments, and associated environment variables.

In one embodiment, the versioning file system 407 manages all of the file versions for each of the recursive Make invocations. Moreover, the central build module 400 relies on the conflict detection and resolution techniques described above to detect and correct missed dependencies between recursive Make invocations. Because a single sequential order exists for all of the jobs in all of the Makefiles, the conflict detection module 404 is able to compare the file versions used in each job with the correct file versions (i.e., those which would have been used in a sequential build).

Another benefit of coalescing Makefiles in this manner is that it reduces file traffic between the central build module 400 and the central file repository 410. For example, if a separate instance of Make is invoked for each Makefile, each instance must read its own file information (such as timestamps) even though many of the same files are referenced across multiple Makefiles. Using the caching techniques described above, file information is cached and shared across all of the Makefiles, thereby reducing node file requests and speeding up the build process.

In some cases, a job with a recursive Make invocation may include a command following the recursive Make invocation in the job script which depends on the results of the recursive Make invocation. Because the Make invocation is not executed directly on the node, as described above with respect to FIG. 9, this may result in a conflict, because the results of the recursive Make invocation will not be available to the subsequent command. By way of example, consider the following job script (which is the body of a single target in a makefile) which includes the recursive Make invocation $(Make) foo:

touch foo.c
$(Make) foo
cat foo

In this example, the subsequent command cat foo depends on foo which is the result of the recursive Make invocation. Because the recursive Make invocation was not actually executed on the node, the result foo will not be available and the command cat foo will fail, causing a build failure.

To solve this problem, in one embodiment of the invention, the recursive Make redirector 900 (or the agent 500) freezes the job script as soon as a recursive Make instance is encountered. The agent 500 then transmits the remaining portion of the script back to the central build module where it is scheduled as a separate job which is dependent on the recursive Make instance. For example, it may be parsed by the parser 450 and included as a construction rule 460 indicating the dependency on the recursive Make instance. Based on the new construction rule, the scheduler 457 schedules the remaining portion of the script to run only after the recursive Make instance has completed.

Alternatively, in one embodiment, the script is split into two separate jobs prior to being run on the node. For example, prior to execution, the scheduler 457 may analyze each script with a recursive Make instance to determine if any subsequent commands within the script depend on the results of the recursive Make instance. If so, then the scheduler 457 separates the script into two discrete jobs within the job graph 461, one which includes the recursive Make instance, and one which depends on the results of the recursive Make instance. In another embodiment, during execution of the commands of the job script, if any of those commands invokes a recursive make, the subsequent commands within the script (in a sequential order in the job script) are separated into a new job.

The underlying principles of the invention are not limited to any particular hardware or networking configuration for the nodes 210-215, the build machine 200 and/or the cluster manager 202. However, in one embodiment, the nodes 210-215 are a plurality of relatively inexpensive rack-mount servers such as Dell PowerEdge™ servers having 1 GHz Processors, 512 Mbytes of double data rate (DDR) random access memory and 40 Gbyte hard drives. In one embodiment, the nodes are coupled together and/or to the cluster manager 202 and build machine 200 via a fast Ethernet switch such as a Dell PowerConnect™ Ethernet switch.

Any desktop computer system communicatively coupled to the nodes 210-215, and capable of executing an instance of the central build module 400 may be used as the build machine 200. Similarly, the cluster manager 202 may be implemented using any workstation or server communicatively coupled to the network. However, for large program builds (e.g., such as the "nightly" build), the build machine is preferably a relatively high powered workstation or server. For example, in one embodiment, the build machine 200 is equipped with two or more Intel® Xeon™ processors operating at 2.80 GHz; 4 Gbytes of dual channel DDR 266 MHz SDRAM memory; and a 600 or more Gbytes SCSI hard drive. Ideally, for large program builds, the build machine should be directly coupled to the same Ethernet switch as the nodes 210-215. Of course, the required hardware specifications for each of the system components will vary, depending on the size of the program builds being executed.

Even if caching policies are employed to preload source files to cluster nodes and to retain the source file at the cluster nodes across multiple jobs (as described above) all source files must still be provided to the cluster nodes 210-215 from the build machine 200 (at least initially). Moreover, the target files, file usage data and other build information must be provided to the build machine 200 following the completion of each job. As such, the communication channel coupling the build machine 200 to the rest of the build system will typically represent a major performance bottleneck. Accordingly, to reduce the amount of data transmitted between the build machine and the rest of the system (e.g., over the link between the Ethernet switch and the build machine, if an Ethernet configuration is used), one embodiment of the invention employs a file distribution mechanism which allows peer-to-peer communication of data files between the cluster nodes 210-215.

Figure 11:
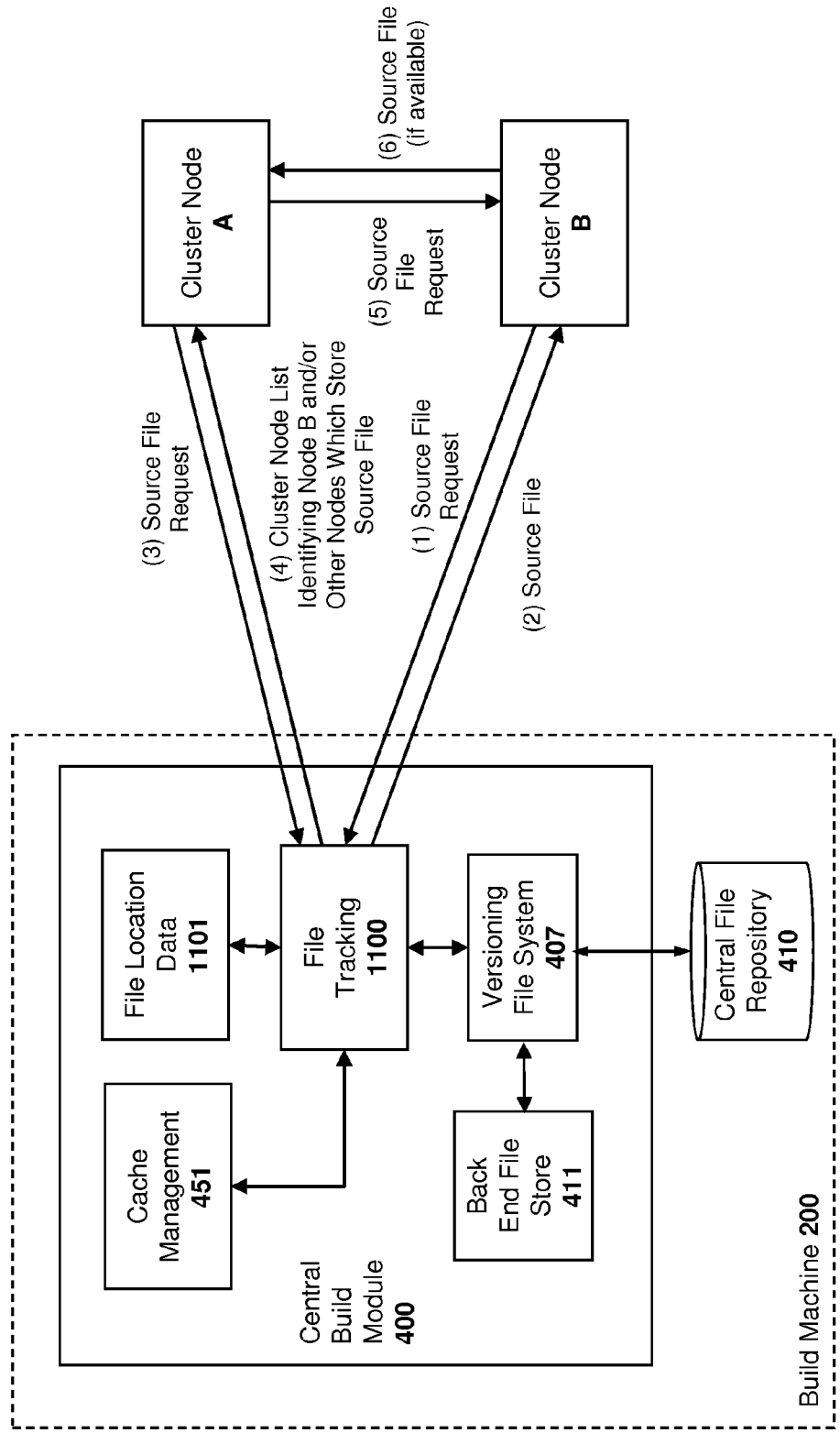
FIG. 11 illustrates a system according to one embodiment of the invention which tracks source files across multiple cluster nodes.

Referring to FIG. 11, one embodiment of the invention includes a file tracking module 1100 for continually tracking the location of each source file across the cluster nodes 210-215. The location of each source file is stored as file location data 1101 on the build machine 200. When a particular node, e.g., Node A, requests a particular source file from the central build module 400, the file tracking module 1100 checks the file location data 1101 to determine whether the source file is located on another one of the cluster nodes, e.g., Node B. If the source file is located on another cluster node, then the file tracking module 1100 identifies the cluster node, or set of cluster nodes, on which the source file is stored. In one embodiment, if the source file is stored on multiple cluster nodes, the file tracking module 1100 sends the requesting node a prioritized list of nodes from which to retrieve the file. The requesting node then attempts to retrieve the source file from the other cluster nodes identified in the list (i.e., starting with the node at the top of the list), thereby reducing the data throughput between the build machine 200 and the rest of the system.

Figure 12:
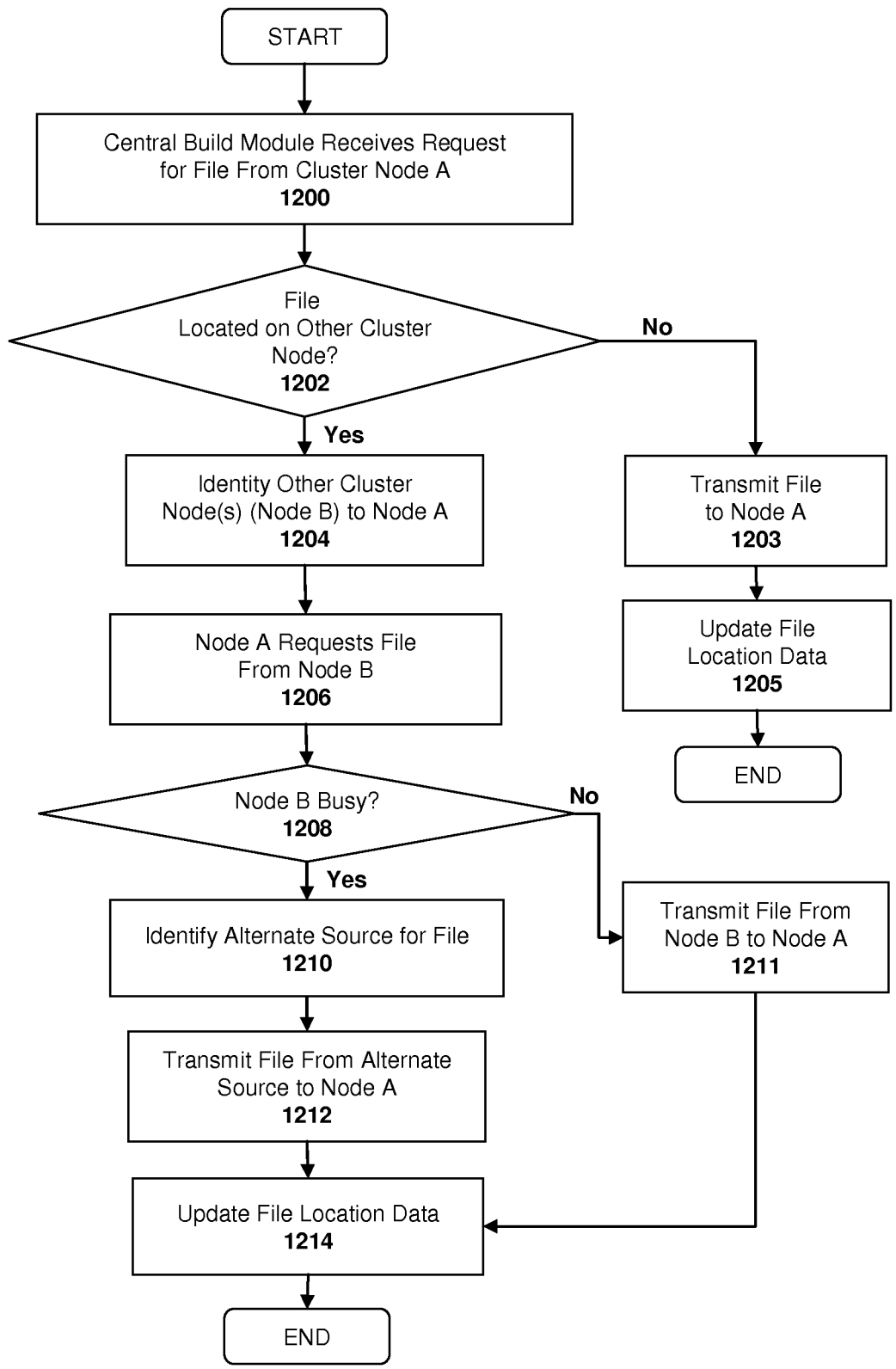
FIG. 12 illustrates a method for tracking source files across cluster nodes according to one embodiment of the invention.

FIG. 12 illustrates a method which may be executed on the architecture shown in FIG. 11. At 1200, the central build module 400, receives a request for a particular source file from Node A. At 1202, the file tracking module 1100 determines if the file is stored on another node by querying the file location data 1101 stored on the central build machine 200. If the source file is not stored on another cluster node then, at 1203, the central build module 400 transmits a copy of the source file to Node A and, at 1205, the file tracking module 1100 updates the file location data 1101 to include an indication of the new cluster node where the source file was transferred—i.e., Node A.

If the source file is stored on another cluster node then, at 1204, the file tracking module 1100 transmits an indication of the cluster node(s) where the source file is located to Node A (Node B in the example). In one embodiment, the file transfer module 1100 does not merely provide an indication of a single node on which the source file is stored. Rather, the file transfer module 1100 provides a prioritized list of cluster nodes on which the source file is stored. At 1206, Node A requests the source file from the highest priority node on the list, i.e., Node B in the example.

The list of nodes may be prioritized in a variety of ways while complying with the underlying principles of the invention. For example, in one embodiment, nodes which requested the source file more recently are placed relatively higher up on the list. Thus, in the foregoing example, Node A would be placed higher up on the list than Node B. Accordingly, if another node—e.g., Node C—subsequently requested the same file, it would be redirected to Node A. Node A would then provide the file to Node C, assuming that it was not busy servicing another node, as described below. Alternatively, or in addition, in one embodiment, the file tracking module 1100 include load balancing logic which generates the prioritized list based on the current processing and/or communications load on each of the cluster nodes. For example, if Node B in the foregoing example is currently working on a large, processor-intensive job, or is currently transmitting a file to another node, then the file tracking module 1100 may place Node B relatively lower on the prioritized list than other nodes which are relatively less busy. In one embodiment, the file tracking module 1100 analyzes the supplemental usage data collected from previous builds (e.g., including the amount of time it took for each job to complete) when generating the prioritized list. In this manner, the file tracking module 1100 can schedule the peer-to-peer transfer of files between nodes in the most efficient manner possible.

Returning to the flowchart illustrated in FIG. 11, if Node B is not busy, determined at 1208, then at 1211, Node B transmits the source file directly to Node A. At 1214, the file tracking module 1100 updates the file location data 1101 to include Node A in the list of nodes which contain the source file. As mentioned above, depending on the prioritization scheme employed by the file tracking module 1100, Node A may be placed at the top of the prioritized list for the source file.

If Node B is busy providing another file to another cluster node, or does not have the source file for some reason (e.g., the file was deleted from Node B, Node B temporarily dropped out of the cluster, . . . etc), then at 1210, alternate locations of the source file are identified. For example, Node A may select the next node from the prioritized list of nodes (i.e., the node with the next-highest priority below Node B). Alternatively, if no additional nodes are included on the list, then Node A may retrieve the source file directly from the file tracking module 1100. Regardless of how the source file is provided to Node A, at 1214, the file tracking module 1100 updates the file location data 1101 to include Node A in the list of nodes which contain the source file.

In one embodiment, each time a requesting node receives a source file from a peer node, the identity of the peer node is stored on the requesting node. Thus, if an alternate location for the file is required (e.g., because a node is busy), the alternate location may be provided directly from the peer node to the requesting node (i.e., rather than merely from the file tracking module 1100). For example, if Node A requests the source file from Node B and Node B is busy, as described above, in one embodiment of the invention, Node B may transmit an indication of the node from which it received the source file, e.g., Node C, to Node A. Node A may then attempt to retrieve the source file directly from Node C. Reallocating file requests in this manner ensures that a particular node does not become overloaded providing multiple source file to multiple cluster nodes at the same time.

Throughout the build process, the same file may be requested at substantially the same time by a plurality of nodes. For example, it is not uncommon for the same header file to be needed at the same time by multiple jobs. Using the techniques described above, the required file may be concurrently streamed from one node to the next, before it is fully received by any individual node, thereby significantly reducing the bandwidth between the build machine 200 and the rest of the system, and the delay for the file upload to subsequent nodes. In one embodiment, the last requesting node will only be N+1 data packets behind with it's download, where N represents the number of nodes in the chain of nodes requesting that particular file.

Figure 13:
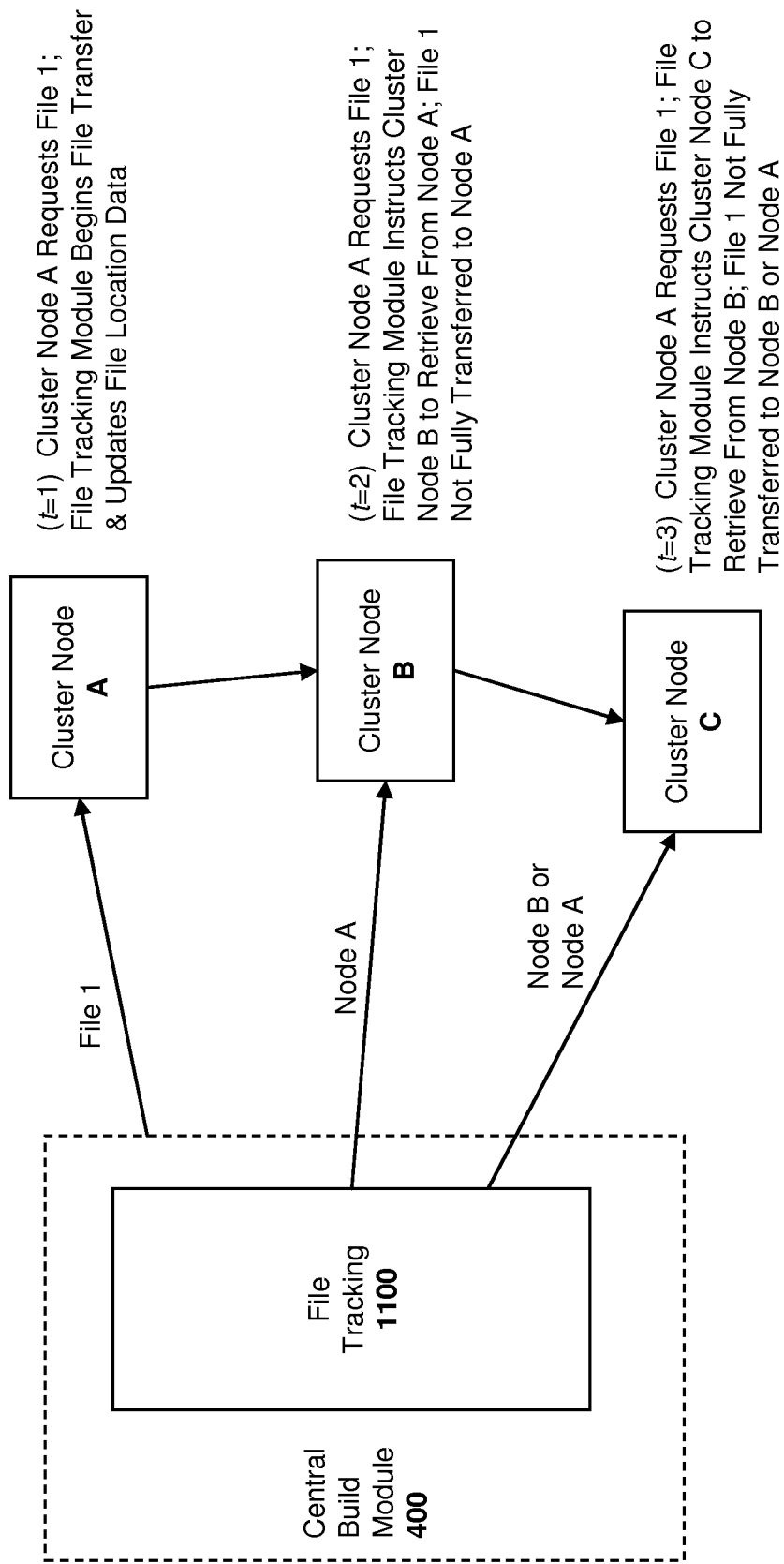
FIG. 13 illustrates one embodiment of a system in which build source files are streamed across multiple cluster nodes.

One example of this operation is illustrated in FIG. 13. Cluster Node A initially requests File 1 from the central build module 400, which begins transferring File 1 to Cluster Node A at time t=1. At time t=2, before the file is fully copied to Node A, Node B requests the same file and is redirected to Node A by the file tracking module 1100. In one embodiment, Node A will begin transferring the file to Node B, even though the file is not fully copied to Node A. For example, as soon as a single data packet containing File 1 data is received by Node A, Node A will immediately transfer the data packet to Node B. This process will continue until the data is fully copied. Similarly, when Node C requests the file, the file tracking module redirects Node C to Node B. Once again, even though the file may still not be fully copied to Node A or Node B, Node B begins transferring File 1 to Node C (i.e., one packet at a time as they are received form Node A). Using the foregoing techniques significantly improves build performance, particularly when large files such as header files are being distributed in a peer-to-peer manner.

As illustrated in FIG. 11, in one embodiment, the file tracking module 1100 communicates with the versioning file system 407 to ensure that the correct file versions are provided to each of the requesting nodes. As described above with respect to FIGS. 8a-b, different versions of content objects and name objects may exist throughout the course of a build. As such, when Node A requests a particular file using a particular file name (or other type of content ID) the correct version of the file must be initially identified by the versioning file system 407. Once identified, the file tracking module 1100 provides the correct version along with an indication of the version to the requesting node (Node A). Subsequently, when Node B requests the file using the same file name (or other content ID), the file tracking module 1100 must initially determine whether the version which was transmitted to Node A is the correct version needed by Node B. If so, then the file tracking module 1100 may redirect Node B to request the file from Node A, as described above. If not, the file tracking module may transmit the correct version of the file, along with the correct version ID code, to Node B.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, machine storage media (e.g., floppy diskettes, optical disks, CD-ROMs, magneto-optical disks, ROMs, RAMs, EPROMs, EEPROMs, magnetic or optical cards, phase-change memory, or other type of media suitable for storing electronic instructions) and machine communication media (e.g., electrical, optical, acoustical, or other form of propagated signals such as carrier waves, infrared signals, digital signals, etc.). For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing description, for the purposes of explanation, numerous specific details are set forth in order to provide a thorough understanding of the present invention. It will be apparent, however, to one skilled in the art that the present invention may be practiced without some of these specific details. For example, while the embodiments described above focus specifically on "Makefiles" and the "Make" utility, the underlying principles of the invention may be employed within the context of virtually any program build environment. By way of example, and not limitation, the same principles may employed within the context of the "Vesta" system developed by the Systems Research Center of Digital Equipment Corporation (DEC) (Vesta uses a "model file" analogous to the Makefile), Microsoft's Visual Studio (e.g., MSBuild), Apache Ant, NAnt, SCons, etc.

In addition, the method illustrated in FIG. 11 may be adapted in a variety of ways while still complying with the underlying principles of the invention. For example, the file location data 1101, indicating the nodes on which each source file is stored, may be maintained on the individual cluster nodes 210-215 in addition to, or in lieu of, the central build module 400.

Figure 19:
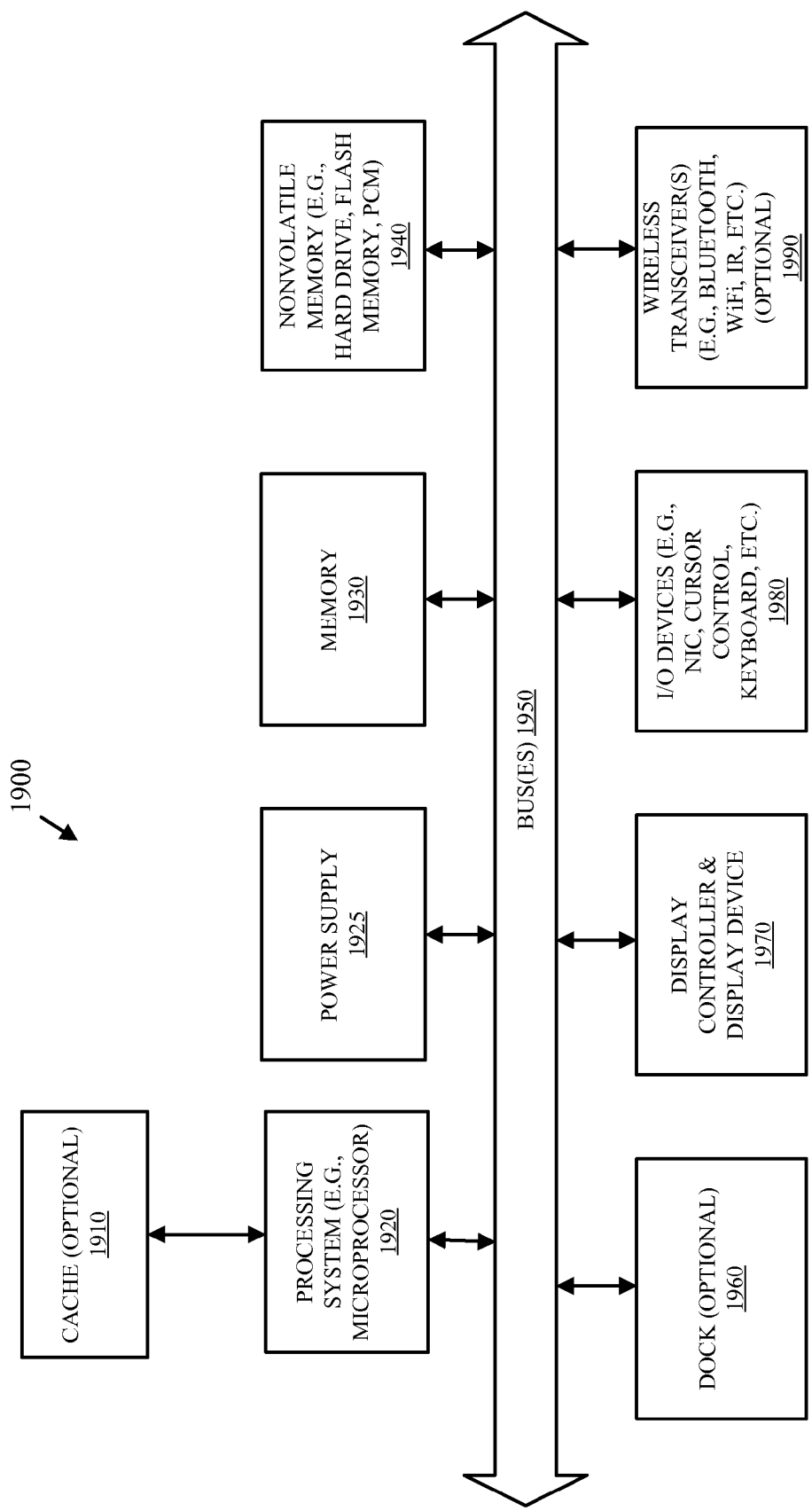
FIG. 19 is a block diagram illustrating an exemplary computing system according to one embodiment of the invention.

FIG. 19 is a block diagram illustrating an exemplary computer system which may be used in some embodiments of the invention. For example, the exemplary architecture of the computer system 1900 may be included build machine 200 and/or any of the nodes 210-215. It should be understood that while FIG. 9 illustrates various components of a computer system, it is not intended to represent any particular architecture or manner of interconnecting the components as such details are not germane to the present invention. It will be appreciated that other computer systems that have fewer components or more components may also be used with the present invention.

As illustrated in FIG. 19, the computer system 1900, which is a form of a data processing system, includes the bus(es) 1950 which is coupled with the processing system 1920, power supply 1925, memory 1930, and the nonvolatile memory 1940 (e.g., a hard drive, flash memory, Phase-Change Memory (PCM), etc.). The bus(es) 1950 may be connected to each other through various bridges, controllers, and/or adapters as is well known in the art. The processing system 1920 may retrieve instruction(s) from the memory 1930 and/or the nonvolatile memory 1940, and execute the instructions to perform operations as described above. The bus 1950 interconnects the above components together and also interconnects those components to the optional dock 1960, the display controller & display device 1970, Input/Output devices 1980 (e.g., NIC (Network Interface Card), a cursor control (e.g., mouse, touchscreen, touchpad, etc.), a keyboard, etc.), and the optional wireless transceiver(s) 1990 (e.g., Bluetooth, WiFi, Infrared, etc.).

While embodiments of the invention has been described in relation to the build machine managing the build process, embodiments of the invention are not so limited. For example, in one embodiment of the invention the build machine participates in the distributed build in addition to managing the build process including all of the other nodes.

In other instances set forth above, well-known structures and devices are shown in block diagram form to avoid obscuring the underlying principles of the present invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method for executing a program build, comprising:
    scheduling jobs to be executed for the program build based on dependencies between the jobs, wherein at least some of the jobs include one or more registry operations;
    collecting usage information from each of the jobs responsive to those jobs being executed, wherein the usage information collected includes registry usage information, the registry usage information being received from those jobs that include the one or more registry operations and including results of those registry operations;
    analyzing the registry usage information to determine whether execution of any of those jobs including the one or more registry operations resulted in a conflict, wherein the analyzing includes, for each job including one or more registry operations, comparing a version of a registry entry used by that job in the program build with a version of a registry entry that the job would have used in a sequential program build;
    invalidating the results of a particular job upon determining that the particular job generated a conflict;
    rebuilding the invalidated job using the correct registry entry version;
    storing a plurality of versions of registry entries used at different points in time during the program build, wherein each of those versions includes a key object version which itself includes one or more sub key object versions and one or more value object versions;
    discarding the results of the job that generated the conflict;
    identifying the correct registry entry versions for the job; and
    rebuilding the job using the correct registry entry versions.

2. The method of claim 1, wherein the jobs are scheduled to different ones of a plurality of nodes to be executed.

3. The method of claim 1, further comprising:
    virtualizing at least a portion of a registry; and
    upon determining that the path of a particular registry operation is included in the virtualized portion of the registry, redirecting that registry operation to the virtualized registry.

4. The method of claim 1, wherein scheduling the jobs comprises:
    analyzing file dependency information contained in a Makefile; and
    scheduling jobs that are independent of one another to execute in parallel.

5. The computer-implemented method of claim 1, wherein the usage information further includes file usage information indicating operations performed on files used by jobs in the program build, the method further comprising:
    analyzing the file usage information to determine whether any of the executed jobs resulted in a conflict, wherein analyzing the file usage information includes comparing versions of files used during the build with versions of files that would have been used in a sequential program build.

6. The method of claim 5, further comprising:
    for each executed job that included one or more registry operations, detecting a conflict based on the comparison between the one or more registry versions used by that job and the one or more registry versions that the job would have used in a sequential program build.

7. The method of claim 6, wherein a conflict is not declared for a particular job including a read operation upon determining that content of the version read by that job in the program build is equivalent to content of the version that the job would have read in a sequential program build.

8. The method of claim 6, wherein a conflict is not declared for a particular job including a conditional set registry operation upon determining that content of the version used by that job in the program build resulted in a set operation and content of the version that job would have used in a sequential program build also would have resulted in a set operation.

9. A program building machine having at least one processor, comprising:
    a job scheduler module to schedule jobs for a program build based on dependencies between the jobs, wherein at least some of the jobs include one or more registry operations;
    a usage tracking module to collect usage information from each of the jobs responsive to those jobs being executed, wherein the usage information collected includes registry usage information, the registry usage information being received from those jobs that include the one or more registry operations and including results of those registry operations;
    a conflict detection module to analyze the registry usage information to determine whether execution of any of those jobs including the one or more registry operations resulted in a conflict, wherein for each job including one or more registry operations, the conflict detection module to compare a version of a registry entry used by that job in the program build with a version of a registry entry that the job would have used in a sequential program build;
    a conflict resolution module to discard the results of a particular job upon a determination that the particular job generated a conflict, to reschedule that job using the correct registry entry version, and to identify the correct registry entry versions for the particular job via the versioning file system;
    a versioning file system to store a plurality of versions of registry entries used at different points in time during the program build, wherein each of those versions includes a key object version which itself includes one or more sub key object versions and one or more value object versions.

10. The program building machine of claim 9, wherein the job scheduler module is to schedule the jobs to different ones of a plurality of nodes.

11. The program building machine of claim 9, wherein the job schedule module is to analyze file dependency information contained in a Makefile and is to schedule jobs that are independent of one another to execute in parallel.

12. The program building machine of claim 9, wherein the usage information further includes file usage information indicating operations performed on files used by jobs in the program build, the conflict detection module further to:
    analyze the file usage information to determine whether any of the executed jobs resulted in a conflict, wherein the conflict detection module is to compare versions of files used during the build with versions of files that would have been used in a sequential program build.

13. The program building machine of claim 12, wherein the conflict detection module further is to, for each executed job that included one or more registry operations, detect a conflict based on the comparison between the one or more registry versions used by that job and the one or more registry versions that the job would have used in a sequential program build.

14. The program building machine of claim 13, wherein the conflict detection module does not declare a conflict for a particular job that includes a read operation upon determining that content of the version read by that job in the program build is equivalent to content of the version that the job would have read in a sequential program build.

15. The program building machine of claim 13, wherein the conflict detection module does not declare a conflict for a particular job that includes a conditional set registry operation upon determining that content of the version used by that job in the program build resulted in a set operation and content of the version that job would have used in a sequential program build also would have resulted in a set operation.

16. A non-transitory machine readable storage medium that provides instructions that, if executed by a machine, will cause the machine to perform operations for executing a program build, comprising
    scheduling jobs to be executed for the program build based on dependencies between the jobs, wherein at least some of the jobs include one or more registry operations;
    collecting usage information from each of the jobs responsive to those jobs being executed, wherein the usage information collected includes registry usage information, the registry usage information being received from those jobs that include the one or more registry operations and including results of those registry operations;
    analyzing the registry usage information to determine whether execution of any of those jobs including the one or more registry operations resulted in a conflict, wherein the analyzing includes, for each job including one or more registry operations, comparing a version of a registry entry used by that job in the program build with a version of a registry entry that the job would have used in a sequential program build;
    invalidating the results of a particular job upon determining that the particular job generated a conflict;
    rebuilding the invalidated job using the correct registry entry version storing a plurality of versions of registry entries used at different points in time during the program build, wherein each of those versions includes a key object version which itself includes one or more sub key object versions and one or more value object versions;
    discarding the results of the job that generated the conflict;
    identifying the correct registry entry versions for the job; and
    rebuilding the job using the correct registry entry versions.

17. The non-transitory machine readable storage medium of claim 16, wherein the jobs are scheduled to different ones of a plurality of nodes to be executed.

18. The non-transitory machine readable storage medium of claim 16, further comprising:
    virtualizing at least a portion of a registry; and
    upon determining that the path of a particular registry operation is included in the virtualized portion of the registry, redirecting that registry operation to the virtualized registry.

19. The non-transitory machine readable storage medium of claim 16, wherein scheduling the jobs comprises:
    analyzing file dependency information contained in a Makefile; and
    scheduling jobs that are independent of one another to execute in parallel.

20. The non-transitory machine readable storage medium of claim 16, wherein the usage information further includes file usage information indicating operations performed on files used by jobs in the program build, the method further comprising:
    analyzing the file usage information to determine whether any of the executed jobs resulted in a conflict, wherein analyzing the file usage information includes comparing versions of files used during the build with versions of files that would have been used in a sequential program build.

21. The non-transitory machine readable storage medium of claim 20, further comprising:
    for each executed job that included one or more registry operations, detecting a conflict based on the comparison between the one or more registry versions used by that job and the one or more registry versions that the job would have used in a sequential program build.

22. The non-transitory machine readable storage medium of claim 21, wherein a conflict is not declared for a particular job including a read operation upon determining that content of the version read by that job in the program build is equivalent to content of the version that the job would have read in a sequential program build.

23. The non-transitory machine readable storage medium of claim 21, wherein a conflict is not declared for a particular job including a conditional set registry operation upon determining that content of the version used by that job in the program build resulted in a set operation and content of the version that job would have used in a sequential program build also would have resulted in a set operation.

* * * * *